(12) United States Patent
Brody et al.

(10) Patent No.: US 10,565,607 B2
(45) Date of Patent: Feb. 18, 2020

(54) BROWSER BASED ADVERTISING PLATFORM AND REWARDS SYSTEM

(71) Applicant: Sion Apps LLC, Glendale, AZ (US)

(72) Inventors: Scott Brody, Glendale, AZ (US); Dustin Robert Wahlen, Syracuse, UT (US); Stephen Allan Wilson, Bellara (AU)

(73) Assignee: Sion Apps LLC, Glendale, AZ (US)

( * ) Notice: Subject to any disclaimer, the term of this patent is extended or adjusted under 35 U.S.C. 154(b) by 0 days.

(21) Appl. No.: 16/133,496

(22) Filed: Sep. 17, 2018

(65) Prior Publication Data

US 2020/0005349 A1    Jan. 2, 2020

Related U.S. Application Data

(60) Provisional application No. 62/691,613, filed on Jun. 29, 2018.

(51) Int. Cl.
*G06Q 30/00* (2012.01)
*G06Q 30/02* (2012.01)

(52) U.S. Cl.
CPC ..... *G06Q 30/0215* (2013.01); *G06Q 30/0236* (2013.01); *G06Q 30/0245* (2013.01); *G06Q 30/0258* (2013.01); *G06Q 30/0269* (2013.01); *G06Q 30/0276* (2013.01)

(58) Field of Classification Search
None
See application file for complete search history.

(56) References Cited

U.S. PATENT DOCUMENTS

| | | | |
|---|---|---|---|
| 9,478,098 B2 | 10/2016 | Polyakov | |
| 9,922,381 B2 | 3/2018 | Isaacson | |
| 2001/0039515 A1* | 11/2001 | Mayadas | G06Q 30/02 705/14.48 |
| 2002/0161779 A1* | 10/2002 | Brierley | G06Q 30/02 |
| 2002/0198796 A1* | 12/2002 | White | G06Q 20/10 705/34 |
| 2004/0093253 A1* | 5/2004 | Iijima | G06Q 30/02 705/14.61 |
| 2006/0282309 A1* | 12/2006 | Zhang | G06Q 30/02 705/14.1 |
| 2007/0260671 A1* | 11/2007 | Harinstein | G06Q 30/02 709/203 |
| 2009/0265243 A1* | 10/2009 | Karassner | G06Q 30/02 705/14.54 |
| 2009/0299857 A1* | 12/2009 | Brubaker | G06Q 30/02 705/14.66 |
| 2010/0077095 A1* | 3/2010 | Wong | G06Q 30/02 709/231 |
| 2011/0118011 A1* | 5/2011 | Filipour | G07F 17/32 463/27 |
| 2012/0136704 A1* | 5/2012 | Carlson | G06Q 30/02 705/14.17 |
| 2012/0232985 A1* | 9/2012 | Lasker | G06Q 30/02 705/14.41 |

(Continued)

*Primary Examiner* — Matthew T Sittner

(57) ABSTRACT

Disclosed is an advertising method which comprises guiding an advertiser to create at least one ad and incentivizing a consumer to access the at least one ad by offering a reward to the consumer for interacting with the ad, wherein consumer profile data useful for ad targeting is acquired as a prerequisite for allowing the consumer to earn the reward.

18 Claims, 17 Drawing Sheets

100

(56) References Cited

U.S. PATENT DOCUMENTS

| | | | | |
|---|---|---|---|---|
| 2013/0014136 A1* | 1/2013 | Bhatia | H04N 21/252 | 725/9 |
| 2013/0124344 A1* | 5/2013 | Kolluri | G06Q 30/0241 | 705/14.73 |
| 2013/0159224 A1* | 6/2013 | Blake | G06Q 30/01 | 706/12 |
| 2013/0185139 A1* | 7/2013 | Nickelson, III | G06Q 30/02 | 705/14.39 |
| 2013/0246109 A1* | 9/2013 | Jain | G06F 11/3006 | 705/7.12 |
| 2014/0019225 A1* | 1/2014 | Guminy | G06Q 30/02 | 705/14.39 |
| 2014/0025461 A1* | 1/2014 | Knowles | G06Q 30/0222 | 705/14.23 |
| 2014/0195332 A1* | 7/2014 | Grauer | G06Q 30/0243 | 705/14.42 |
| 2014/0278869 A1* | 9/2014 | Wagner | G06Q 30/0215 | 705/14.17 |
| 2015/0294358 A1 | 10/2015 | Galadari et al. | | |
| 2015/0317666 A1 | 11/2015 | Pygnasak | | |
| 2016/0012424 A1* | 1/2016 | Simon | G06Q 20/3674 | 705/67 |
| 2016/0191702 A1* | 6/2016 | Gabbai | H04M 3/4286 | 379/266.06 |
| 2016/0350782 A1 | 12/2016 | Wang | | |
| 2016/0358203 A1 | 12/2016 | Rulli | | |
| 2016/0366662 A1* | 12/2016 | Kobayashi | H04N 21/43615 | |
| 2017/0178099 A1* | 6/2017 | Truong | G06Q 20/20 | |
| 2017/0316468 A1 | 11/2017 | Byrne | | |
| 2017/0337552 A1 | 11/2017 | Mandal et al. | | |
| 2018/0025442 A1 | 1/2018 | Isaacson | | |
| 2018/0068526 A1 | 3/2018 | Burgin et al. | | |
| 2018/0189818 A1 | 7/2018 | Narayanam et al. | | |
| 2018/0211352 A1* | 7/2018 | Lim | G06Q 50/30 | |

* cited by examiner

BROWSER BASED ADVERTISING PLATFORM AND REWARDS SYSTEM

CROSS-REFERENCE TO RELATED APPLICATIONS

This application claims benefit to Provisional Application No. 62/691,613 filed Jun. 29, 2018, which is incorporated herein by reference.

FIELD OF THE DISCLOSURE

The present disclosure relates generally to digital network based advertising methods and more particularly to incentive based advertising methods.

BACKGROUND OF THE DISCLOSURE

Online advertising frequently involves both a publisher, who integrates advertisements into its online content, and an advertiser, who provides the advertisements to be displayed on the publisher's content, similar to other advertising media. Various forms of online advertising may include email marketing, search engine marketing (SEM), social media marketing, many types of display advertising (including web banner advertising), and mobile advertising.

However, while online advertising may provide a low-cost tool for reaching large audiences, the online community increasingly regards Online advertising as obtrusive and invasive. Moreover, Online advertising may be an avenue for Internet crime, subjecting users to various scams, and malware downloads.

Thus, users have come to habitually ignore ads, and may even employ ad-blocking or ad-filtering technology to screen out ads, while a number of browsers block unsolicited pop-up ads by default.

Legitimate advertisers may find themselves victims as well. For example, in cost-per-click ads, wherein advertisers pay each time a user clicks on the ad, fraud may occur when a publisher or third party clicks on an ad with no legitimate buying intent. This can occur, for example, when a competitor clicks on ads to deplete its rival's advertising budget, or when publishers attempt to manufacture revenue.

As such, there is a need for improved advertising methods that are both safe and welcomed by the consumer, and provide effective marketing for the advertiser.

BRIEF SUMMARY OF THE DISCLOSURE

The present disclosure provides an approach for network-based advertising which guides an advertiser and incentivizes consumer participation via an incentive system. In embodiments, the consumer registers into the system and the system only advertises to registered consumers. In preferred embodiments, the incentive system is based on a reward comprising block chain tokens. However, various rewards may be employed in accordance with the disclosed system, including, but not limited to, various virtual currency (crypto currency) and digital token systems, real currency, and/or store/gift credit, etc.

According to various embodiments, disclosed is an advertising method comprising: an advertiser interaction system comprising guiding at an advertiser to create at least one ad; and a consumer interaction system comprising: incentivizing a consumer to access the at least one ad by offering a reward to the consumer for interacting with the ad, acquiring consumer profile data as a prerequisite for allowing the consumer to earn said reward, wherein said consumer profile data comprises information regarding the consumer useful for ad targeting, wherein the consumer is an established participant of the consumer interaction system. In some embodiments, information regarding the consumer includes at least one category of goods and/or services of interest to the consumer. In further embodiments, a reward offered to the consumer comprises block chain tokens. In yet further embodiments, interacting with the ad by the consumer includes clicking on the ad and/or viewing the ad.

According to various aspects, a reward amount offered to the consumer for interacting with the ad is based on the amount of consumer profile data, and is increased as the consumer provides more data.

In some embodiments, the method further comprises requiring the consumer to establish participation status by providing consumer identifying information and/or downloading software for implementing the advertising method on an electronic device. In further embodiments, the advertiser interaction system comprises providing information to the advertiser regarding the performance of the ad to assist the advertiser in evaluating the performance of the ad. In yet further embodiments, the consumer interaction system and/or advertiser interaction system is at least partially performed on a browser of the consumer and/or advertiser.

In some embodiments, guiding an advertiser to create at least one ad comprises: guiding the advertiser to provide ad profile data, said ad profile data including at least one category of goods and/or services to which the ad relates; guiding the advertiser to customize an appearance of the ad; and assigning a reward amount dedicated for rewarding a consumer for interacting with the ad. In preferred embodiments, the reward comprises block chain tokens. In some embodiments, the reward may comprise other digital tokens or virtual currency (crypto currency) systems, real currency, store/gift credit, etc. In some embodiments, the reward amount dedicated for rewarding the consumer is assigned by the advertiser. In some embodiments, the advertiser may be required to pay a fee for the ad, which may be in a real currency, virtual currency, and/or tokens (blockchain).

In further embodiments, a reward amount (i.e. in block chain tokens) designated by the advertiser may be held in an escrow account, associated with the ad. In some embodiments, the method further comprises selecting an ad to be sent to the consumer comprising matching the consumer profile data with the most relevant ad based on profile data related to the ad. In further embodiments, successive reward earning events are separated by a specific time window. In yet further embodiments, the method comprises a coupon system comprising: offering at least one coupon associated with a product and/or service to the at least one consumer, wherein consumer access to the coupon is based on rewards earned by the consumer for ad viewing. In some embodiments, consumer participants may be sorted into a prioritized roster system to determine which participant(s) have priority to receive at least one ad. Factors in determining priority may include the amount of time elapsed since the participant(s) received and ad and/or earned a reward, websites viewed by the participant(s) since the participant(s) received an ad and/or earned a reward, maximum rewards earned by the participant(s) over a past short time window (e.g. 24 hr period), and/or maximum rewards earned by the participant(s) over a past longer time window (e.g. 7 day period).

According to various aspects, disclosed is an advertising method comprising: incentivizing a consumer to request to view an ad by offering a reward to the consumer for ad viewing; upon a request by the consumer to view an ad, determining an ad which is targeted to the consumer's purchasing interests and sending the ad to the consumer; and awarding the consumer for engaging with the ad. In some aspects, the method further comprises requiring profile data from the consumer upon said request, as a prerequisite for allowing the consumer to earn said reward, wherein said profile data comprises information regarding the consumer useful for ad targeting. In some embodiments, the method further comprises requiring registration from a consumer and an advertiser for participation in the advertisement method. In some embodiments, the reward offered comprises block chain tokens placed in an escrow account by an advertiser, wherein the tokens are dedicated to rewarding at least one consumer for viewing an ad created by the advertiser. In some embodiments, the method further comprises guiding an advertiser to create an ad, and to provide ad profile data useful for ad targeting. In further embodiments, the method further comprises providing information to the advertiser regarding the performance of the ad to assist the advertiser in evaluating the performance of the ad. In further embodiments, the method further comprises setting a prioritized roster system for determining an order of priority among different consumers for receiving at least one ad.

BRIEF DESCRIPTION OF THE DRAWINGS

The present subject matter will now be described in detail with reference to the drawings, which are provided as illustrative examples of the subject matter so as to enable those skilled in the art to practice the subject matter. Notably, the FIGs and examples are not meant to limit the scope of the present subject matter to a single embodiment, but other embodiments are possible by way of interchange of some or all of the described or illustrated elements and, further, wherein:

FIG. 4A illustrates a section of the ad creation page configured for carrying out a category selection step, according to an exemplary embodiment;

FIG. 4B illustrates a section of the ad creation page configured for carrying out an ad appearance step, according to an exemplary embodiment;

FIG. 4C illustrates a section of the ad creation page configured for carrying out a keyword input step, according to an exemplary embodiment;

FIG. 4D illustrates a section of the ad creation page configured for carrying out a metadata input step according to an exemplary embodiment;

FIG. 4E illustrates a section of the ad creation page configured for carrying out an ad submission step according to an exemplary embodiment;

FIG. 8A is an exemplary embodiment of an interests subpage of the user profile page.

Figure 1:
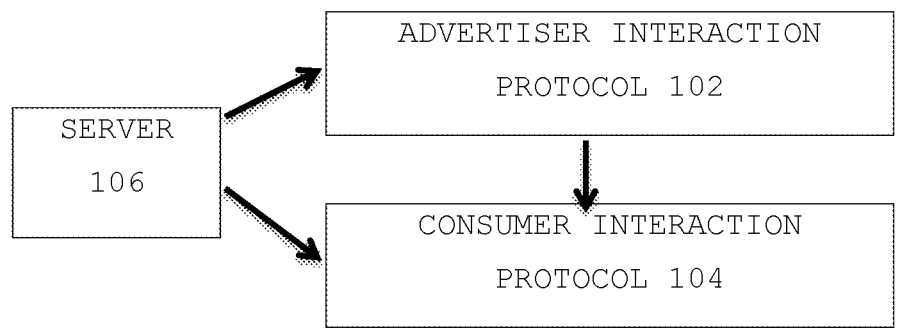
FIG. 1 is a block diagram for an advertising method in accordance with various embodiments of the present disclosure.

While the disclosure is subject to various modifications and alternative forms, specific embodiments thereof are shown by way of example in the drawings and the accompanying detailed description. It should be understood, however, that the drawings and detailed description are not intended to limit the disclosure to the particular embodiments. This disclosure is instead intended to cover all modifications, equivalents, and alternatives falling within the scope of the present disclosure as defined by the appended claims.

DETAILED DESCRIPTION OF ILLUSTRATIVE EMBODIMENTS

The detailed description set forth below in connection with the appended drawings may be intended as a description of exemplary embodiments in which the presently disclosed process can be practiced. The term "exemplary" used throughout this description means "serving as an example, instance, or illustration," and should not necessarily be construed as preferred or advantageous over other embodiments. The detailed description includes specific details for providing a thorough understanding of the presently disclosed method and system. However, it will be apparent to those skilled in the art that the presently disclosed process may be practiced without these specific details. In some instances, well-known structures and devices are shown in block diagram form in order to avoid obscuring the concepts of the presently disclosed method and system.

In the present specification, an embodiment showing a singular component should not be considered limiting. Rather, the subject matter preferably encompasses other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present subject matter encompasses present and future known equivalents to the known components referred to herein by way of illustration. Although the method and system here disclosed have been described in detail herein with reference to the illustrative embodiments, it should be understood that the description may be by way of example only and may be not to be construed in a limiting sense. It may be to be further understood, therefore, that numerous changes in the details of the embodiments of the disclosure will be apparent to, and may be made by, persons of ordinary skill in the art having reference to this description. It may be contemplated that all such changes and additional embodiments are within the spirit and true scope of this disclosed method and system as claimed below.

The present disclosure introduces a method and system for Internet-based advertising, which guides interaction between advertiser and consumer, and incorporates an incentive based approach. The disclosed approach further provides privacy and protection to the advertiser and consumer by providing an opt-in system.

With reference to FIG. 1, an advertising system and method 100 in accordance with the present disclosure comprises an advertiser interaction system 102 and a consumer interaction system 104, according to various embodiments. The advertising method 100 may be implemented and controlled by a host entity, operating through a host entity server 106, and provided to the user (i.e. consumer and/or advertiser) through a graphical user interface (GUI) of a processing device, such as a personal computer, laptop, tablet, iPhone, and the like. In embodiments, host entity server 106 may operate via an apparatus comprising one or more processors, system memory, and/or one or more non-transitory memory units, all of which may be directly or indirectly coupled to and/or in communication with each other.

In embodiments, a suitable GUI for implementing method 100 may include, but is not limited to a browser, webpage, desktop or system display, and combinations thereof. In embodiments, method 100 may be implemented via downloadable program and/or software (e.g. plug-in, add-on), which may be provided through a website, app store, and the like. In some embodiments, the method 100 may be implemented on a custom (open source) browser which a user may download, or as a plug in on third-party browsers (e.g. Mozilla, Explorer, Google Chrome, etc.).

Advertiser Interaction System

Figure 2:
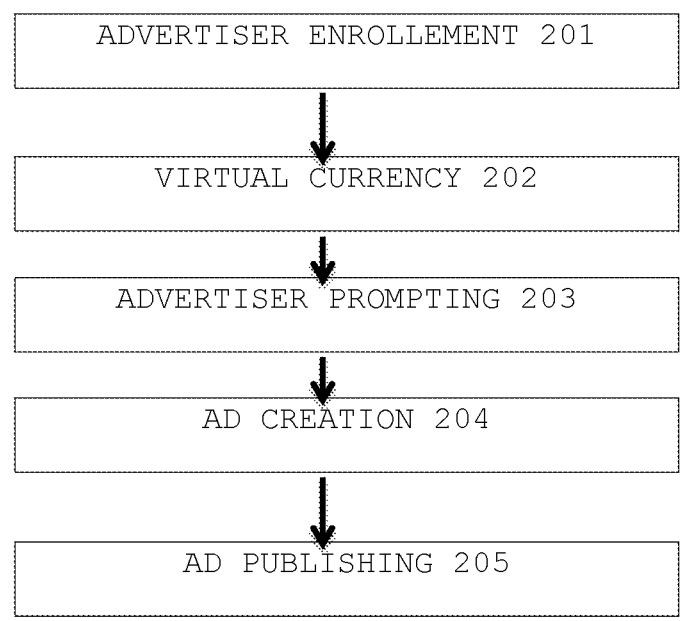
FIG. 2, is a block diagram illustrating steps for the advertiser interaction system of FIG. 1, in accordance with various embodiments.

According to various embodiments, as shown in FIG. 2, the advertiser interaction system 102 comprises securing virtual currency from an advertiser (virtual currency step 202), creating an advertisement (ad creation step 204), and making the ad available for accessing and/or viewing (Ad Publishing step 205). In embodiments, the virtual currency is preferably in block chain tokens. In embodiments, Advertiser Interaction system 102 may further comprise establishing the advertiser as a participant (advertiser enrollment step 201). In embodiments, advertiser Interaction System 102 may further include prompting the advertiser to create an ad (advertiser prompting step 203). In embodiments, advertiser Interaction System 102 may further include managing the ad once it publishes (ad management step 206).

In embodiments, steps 201, 202, 203, 204, 205, and/or 206 may be carried out by the host entity of the advertising method 100, by the advertiser of the advertising method, or both. In embodiments, the host entity may prompt and/or guide the advertiser to at least partially carry out and/or complete various steps, as detailed below. Additionally, the various steps of advertiser interaction system 102 need not be carried out on the same GUI. For example, advertiser enrollment step 201 may be carried out through a webpage, while the remaining steps may be carried out on a user browser.

Furthermore, steps 201, 202, 203, 204, 205, and/or 206 may be carried out in various orders, and may overlap according to various embodiments.

Advertiser Enrollment Step 201

In embodiments, the advertiser may be required to establish participation status by subscription or enrollment, according to step 201. In embodiments, advertiser enrollment step 201 may comprise indicating an intent to participate by the advertiser, collecting information regarding the advertiser (i.e. company name, business type, etc.) which may be associated with an advertiser id, collecting a fee from the advertiser, and/or providing software associated with method 100 for download by the advertiser and/or installation. Enrollment may be carried out through a webpage, app, email, and the like. In some embodiments, the advertiser enrollment 201 may comprise requiring purchase of crypto currency; thus step 202 may be part of, or effectuate step 101. In other embodiments, purchase of crypto currency may not be required for enrollment; thus step 201 and 201 may be separate steps. In embodiments, the platform/GUI for advertiser enrollment may be different than that for carrying out the other steps (i.e. 202, 203, 204, and/or 205) of advertiser interaction system 102. For example, an advertiser may enroll through a webpage, while other method steps may be carried out through a custom browser.

Virtual Currency Step 202

In embodiments, the advertiser may be required to prepay for the reward designated for consumer incentive. This may require purchase virtual currency or crypto currency according to step 202. In embodiments, such virtual currency may preferably comprise block chain tokens.

In embodiments, virtual currency (i.e. block chain tokens) may be purchased digitally using traditional payment methods, such as credit card, online payment systems such as PAYPAL™, electronic bank/wire transfer, and the like. In embodiments, tokens may be purchased from the system host entity operating through host entity server 106. In embodiments, the purchased virtual currency may be held electronically in an escrow account associated with the advertiser and/or in a virtual wallet (crypto currency wallet).

In embodiments, a fee may be required by the system host entity for the ad, which may be fixed and/or may be based on various factors such as ad display time, ad display frequency, and consumer interaction with the ad (including collecting/obtaining consumer provided information, collecting/obtaining consumer behavioral information, consumer viewing time, consumer viewing frequency, the number of different consumers viewing the ad, consumer purchase(s) etc.), etc., and combinations thereof. In some embodiments, the ad may be paid for by block chain tokens, for example, bitcoin, or other token or virtual currency, real currency (e.g. via credit card or other online payment system such as PayPal™ and the like), etc.

In embodiments, virtual currency/block chain tokens may be used to reward the consumer for interacting with the ad including clicking on and/or viewing the ad. In embodiments, the consumer may be required to provide personal information to be used in ad targeting (i.e. determining which ads are relevant to the consumer's purchasing interests), so that the consumer may receive ads to earn rewards by interacting with the ad. In further embodiments, the rewards provided for interacting with the ad may be based on the amount of personal information provided, and may be increase as the consumer provides more information. For example, by filling in more targeting information, the consumer may earn a higher number of rewards per view/click, according to various embodiments.

In other embodiments, virtual currency/block chain tokens may be used to reward the consumer for providing personal information, making purchases, referring to other consumers, signing up to receive emails and/or coupons, etc., and combinations thereof, as may be apparent to those skilled in the art.

Various embodiments for payment structure, i.e. allocation of virtual currency/tokens will be apparent to one skilled in the art. For example, the ad may be displayed for free, wherein the advertiser may pay the system host and reward the consumer for consumer interaction; the advertiser may pay the system host for ad display, but not for consumer interaction, and reward the consumer for purchases and providing information; or the advertiser may pay the host entity for ad display and consumer interaction, as well as provide consumer rewards for providing information, etc., according to various embodiments. Other examples may include allocating a certain percentage of the tokens (e.g. 50%, 25%, 10%, etc.) to ad listing and a certain percentage (e.g. 50%, 75%, 90%, etc.) to consumer rewards, according to various embodiments.

Additionally, the allocation may be based on the specific type of ad listing and/or consumer rewards, as will be apparent to one skilled in the art. For example, in ad listing, the amount allocated to ad display frequency may be different from the amount allocated to consumer interaction; or in consumer rewards, the amount allocated for rewards based on providing information may be different than the amount allocated for consumer purchases, etc., according to various embodiments.

In some embodiments, the system host may set a fixed structure, or give the advertiser options in determining the structure for allocation of the virtual currency/block chain tokens. In some embodiments, cost structure may be on a sliding scale; for example, adjustments may be made dependent on at least one of sales, consumer interactions, etc. Various embodiments will be apparent to one skilled in the art.

Advertiser Prompting Step 203

In embodiments, a prompting display may appear on the advertiser's device to direct the advertiser open an ad creation page 400. In some embodiments, the prompt display may appear on the advertiser's browser, which is configured to perform method 100. In embodiments, the prompting display may include an icon, text message, image, etc., which may be opened and/or expanded by clicking or hovering over with a mouse. In some embodiments, the display may appear upon opening the browser (or other device). In some embodiments, the display prompt may remain on the screen permanently. In other embodiments, the advertiser may be provided with the option of disabling the prompting display; this may include the option to permanently disable, disable until the next user session, or disable for a specified time period, according to various embodiments.

Ad Creation Step 204

Figure 3:
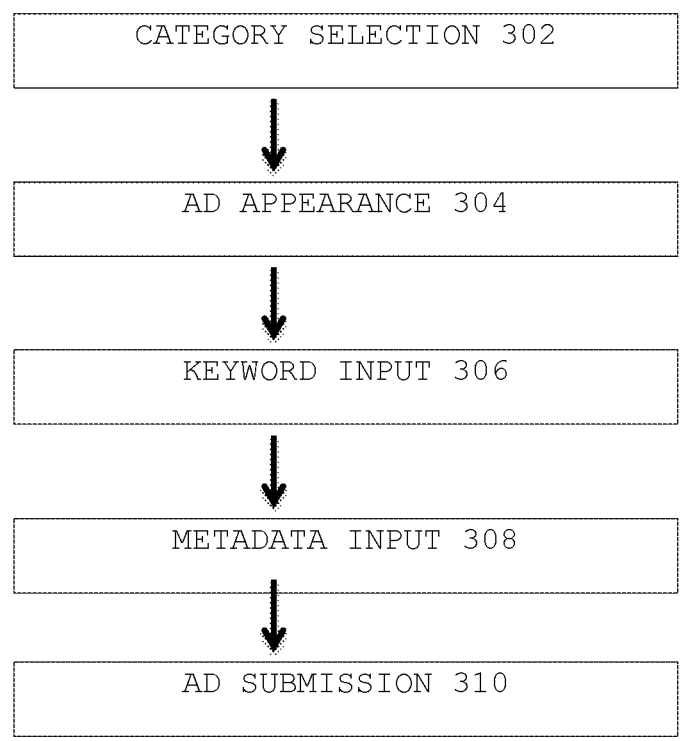
FIG. 3 is a block diagram illustrating an ad creation step for the advertiser interaction system of FIG. 1, in accordance with various embodiments.

In embodiments, Ad creation step 204 guides, and/or instructs an advertiser to create an ad, and/or provide at least one parameter for consumer targeting and/or consumer interaction with the ad as illustrated in FIG. 3. In embodiments, Ad creation step 204 may comprise sub-steps of instructing the advertiser to select an ad category (category selection step 302); guiding the advertiser to customize the appearance of the ad (Ad appearance step 304); refining ad targeting by adding tags, keywords (keyword input step 306); adding metadata for further ad targeting (metadata input step 308); and/or submitting the ad for approval (Ad submission step 310). In some embodiments, the advertiser may include one or more links, for example, to the advertiser's website, for embedding in the advertisement. In further embodiments, the advertiser may input dedicated tokens which may be used as an incentive or reward provided to the consumer for interacting with the ad, as detailed below. According to various embodiments, a fee may be charged by the system host for the ad. The advertiser may make a payment (e.g. by credit card, or other payment system such as PayPal™), and/or pay with tokens from the advertiser's virtual wallet. In some embodiments, the advertiser may be given the option to pay according to his preferred payment method.

FIGS. 4A-4E provide an exemplary embodiment of an ad creation page 400 for implementing sub-steps 302, 304, 306, 308, and/or 310. As can be seen in the figures, ad creation page 400 may include sections configured for carrying out the various sub-steps of ad creation step 204. In accordance with the exemplary embodiment shown, the various sections may comprise "section pages" such as section pages 402, 404, 406, 408, and/or 410 which are configured to carry out steps 302, 304, 306, 308, and/or 310, respectively. Such section pages may be opened by clicking on associated tabs 401 presented on the ad creation page 400, for example. Other suitable embodiments may be apparent to those skilled in the art. For example, sections 402, 404, 406, 408, and/or 410 may be presented as distinct fields on ad creation page 400.

Figure 4A:
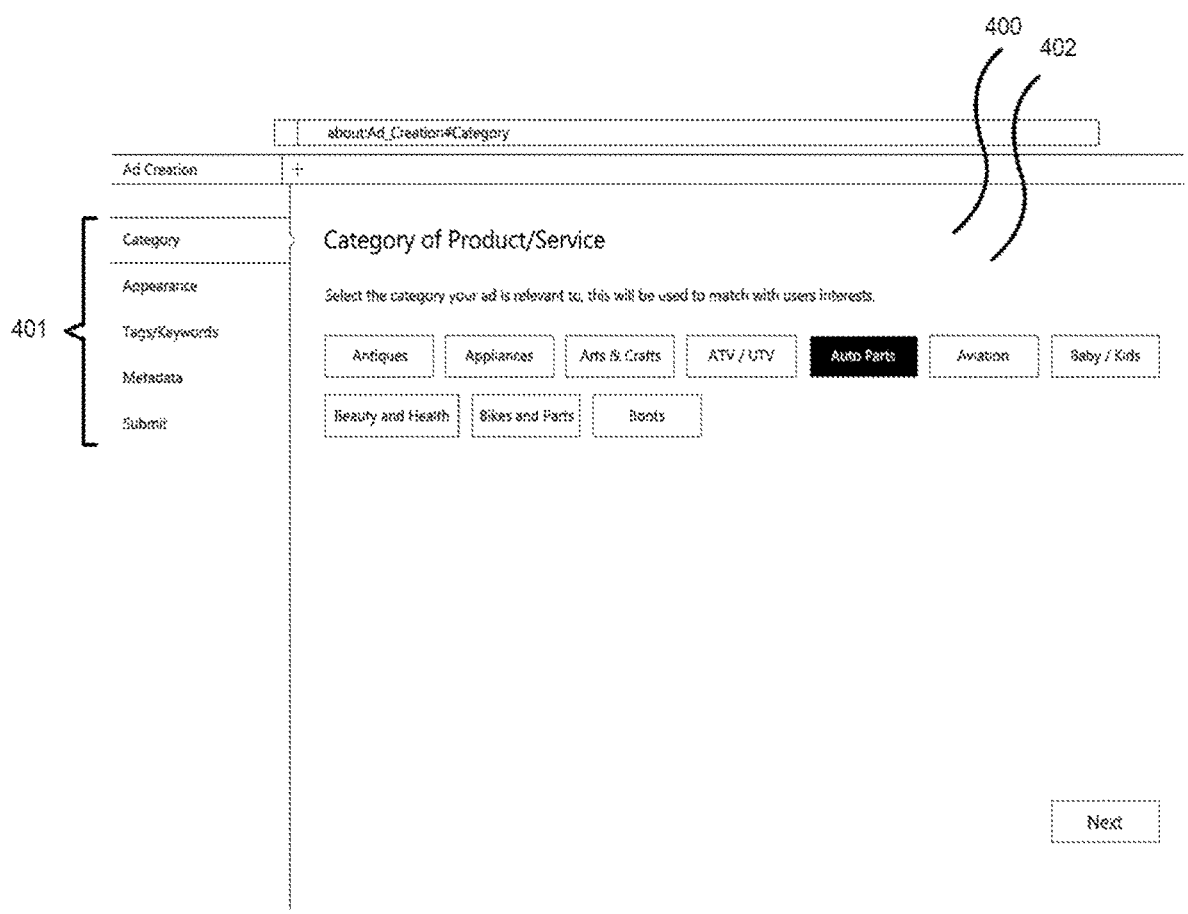
FIGS. 4A-4E provide an exemplary embodiment of an ad creation page for implementing the ad creation step of FIG. 3.

Category Selection:

FIG. 4A illustrates an exemplary embodiment of section page 402 configured for carrying out category selection step 302. As shown in the figure, page 402 may present a number of categories of various products and services, wherein the advertiser may be prompted to click on at least one category most closely describing his product/service, according to various embodiments. Other embodiments for carrying out category selection may include, for example, providing a drop down list, list box, keyword search, alphabetical search, and various other graphical control elements, as may be apparent to those skilled in the art.

Figure 4B:
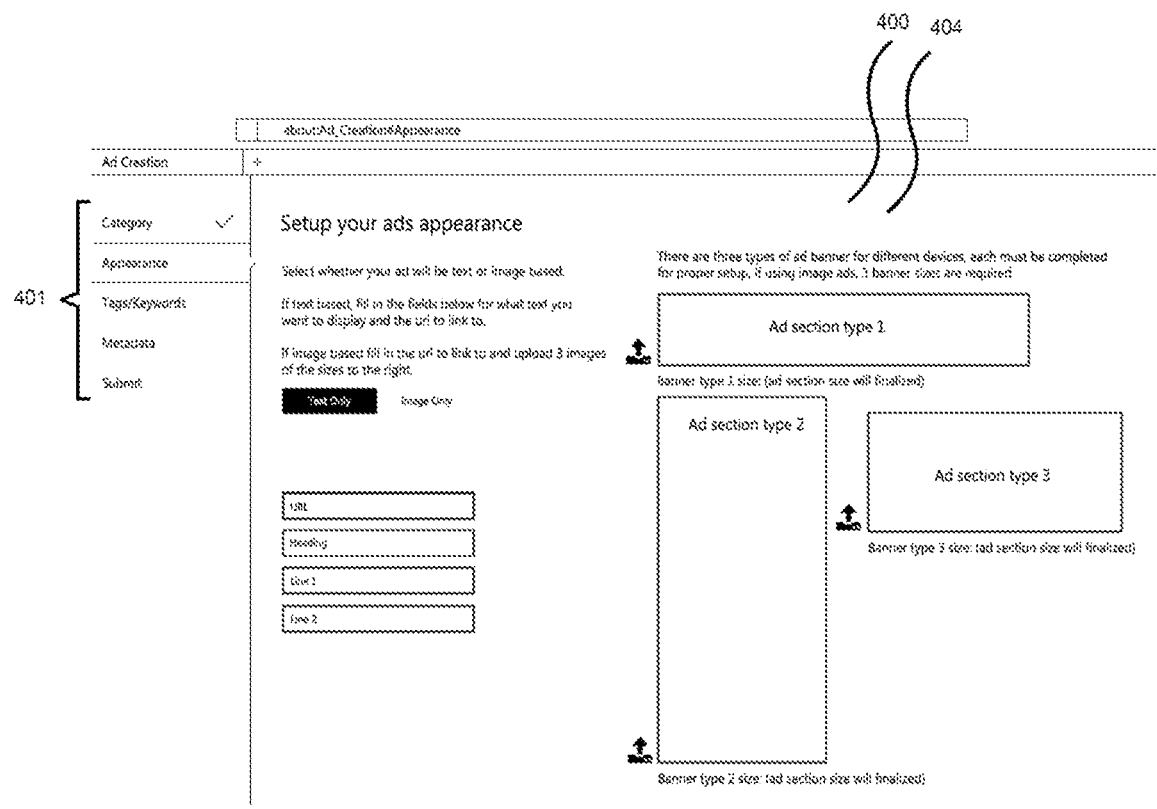

Ad Appearance:

FIG. 4B illustrates an exemplary embodiment of section page 404 configured to carry out Ad Appearance step 304 for customizing Ad appearance. In embodiments, this may include prompting the advertiser to select whether the ad will be text or image based, as shown in the figure; then, depending on the advertiser's selection, prompting the advertiser to either provide the text for display or upload at least one image for display. In embodiments, different image upload sections may be provided for different devices, as shown in the figure. Other embodiments for setting up ad appearance may include providing various graphic design and editing tools, stock images (which may be related to the category selected), animated images, sound effects, and the like, as will be apparent to one skilled in the art.

Figure 4C:
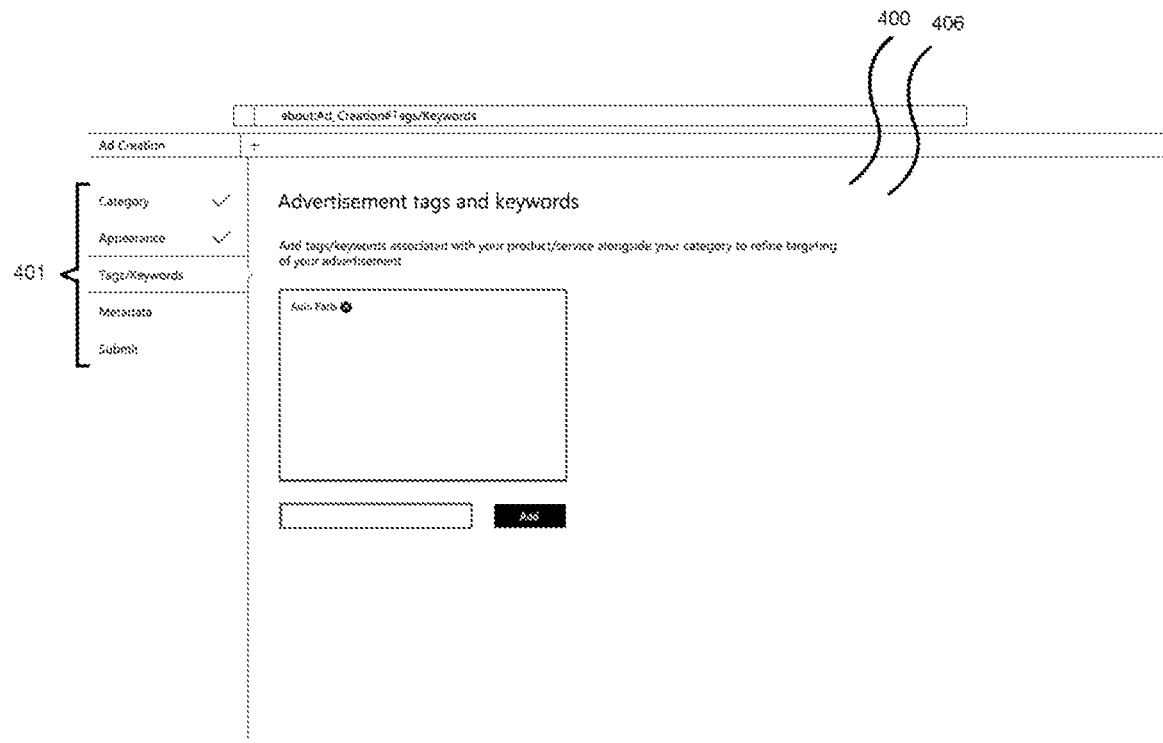

Refining Ad Targeting:

FIG. 4C illustrates an exemplary embodiment of section page 406 configured to carry out keyword input step 306 for refining ad targeting by including tags and keywords associated with the product/service being advertised. In embodiments, the advertiser may input various tags and/or keywords. In some embodiments, these may be suggested to the advertiser based on the ad appearance and/or category selection.

Figure 4D:
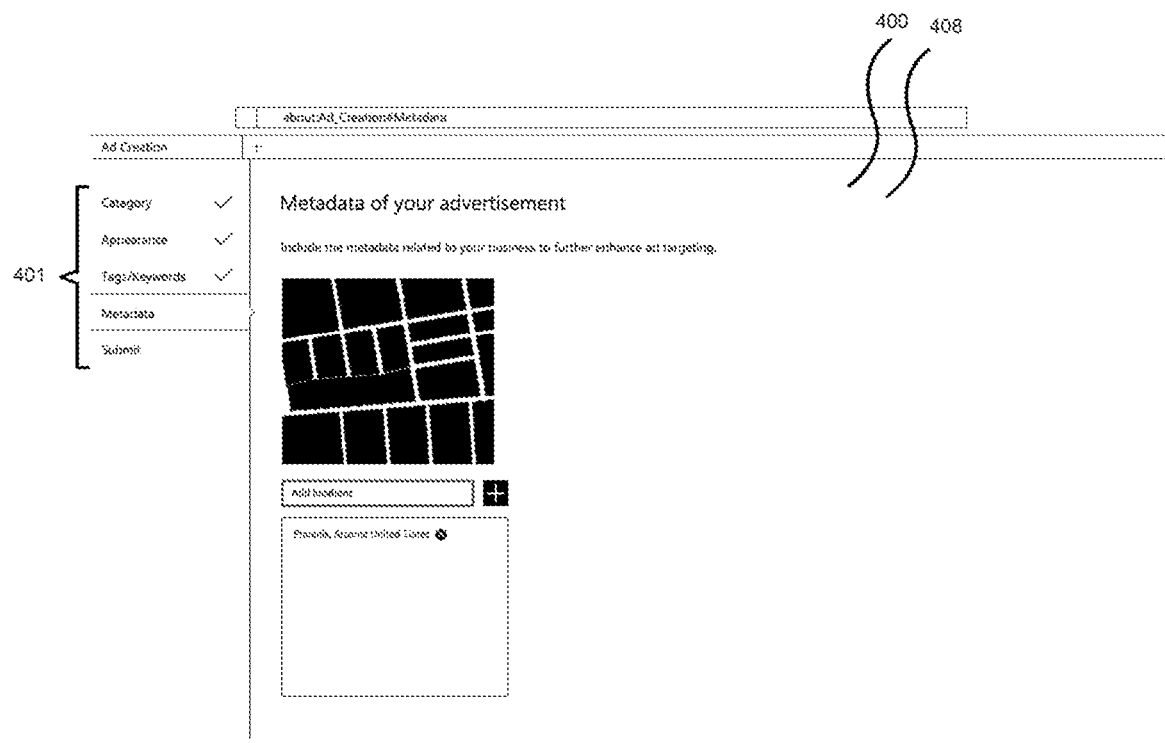

FIG. 4D illustrates an exemplary embodiment of section page 408 configured to carry out metadata input step 308 for enhancing targeting by adding metadata to the advertisement. Metadata may include, for example, a location associated with the advertiser, a more specific description of the product/service, and the like.

Figure 4E:

Ad Submission:

FIG. 4E illustrates and exemplary embodiment of section page 410 configured to carry out Ad submission step 310. In embodiments, ad submission 310 may include prompting the advertiser to review and approve the ad. This may comprise providing the advertiser with a preview of the Ad appearance, review of the Ad category, tags/keywords, and/or metadata; and may further including providing the option to edit the Ad. In embodiments, ad submission 310 may further comprise suggesting possible improvements and/or errors in the ad.

In embodiments, ad submission may further include indicating an amount of virtual currency/block chain tokens dedicated to paying for the ad. This may include the amount dedicated to paying consumer rewards for consumer interaction with the ad.

Upon submission of the ad by the advertisers, the tokens dedicated to the ad may be moved (e.g. from advertiser's wallet) to an escrow account, which may be associated with the ad and/or advertiser. In some embodiments, tokens initially purchased by the advertiser from the system host may automatically be stored in the advertiser's escrow account; thus the advertiser may dedicate tokens from his escrow account upon submission of the ad.

In embodiments, Ad submission step 310 may further comprise approval of the ad by the system host. In some embodiments, if the ad is not approved, the amount in escrow (i.e. dedicated for paying for the ad) may be refunded to the advertiser. In some embodiments, tokens in escrow cannot be refunded.

Ad Publishing Step 205

Once the ad is approved by both the advertiser and system host entity, the ad may be ready for accessing and/or viewing by the consumer, according to step 205. In embodiments, the ad may be sent to an ad database of the server 106, and may be associated with an assigned ad id. In embodiments the ad may be sent to the consumer for viewing upon a match between targeting information provided by the consumer and the advertiser and/or by a request from the consumer to view the ad. Therefore, the consumer may be required to provide profile information used for ad targeting in order to view the ad, according to various embodiments.

In embodiments, the ad may appear on a browser configured to enable ad viewing according to method 100. The browser may be a custom browser installed on the consumer's device, or a third party browser to which software configured to support method 100 has been installed.

Ad Management Step 206

According to various embodiments, the advertiser may be provided with information concerning the performance of his ad according to Ad management step 206. In embodiments, this may comprise information relating to consumer interaction with the ad, such as number of views and/or clicks per time period; amount of virtual currency used and/or remaining in the account; and other such information which may allow the advertiser to evaluate the effectiveness of the ad.

Figure 5:
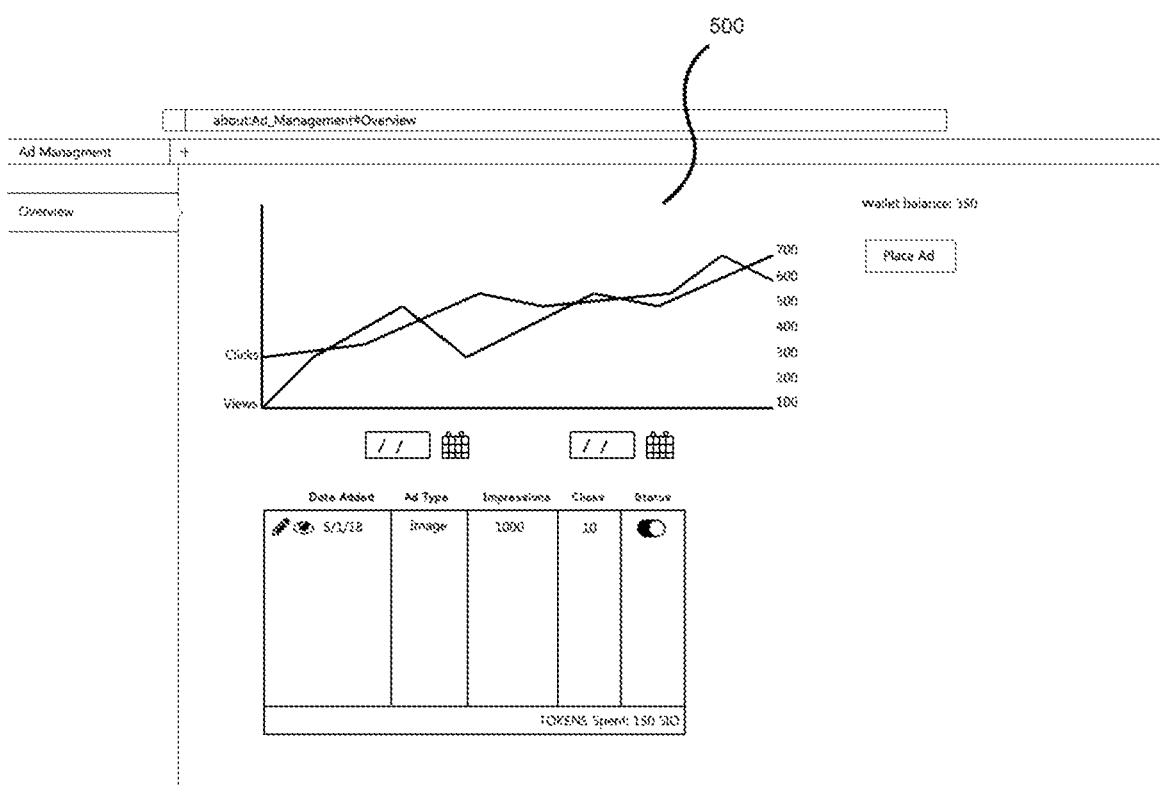
FIG. 5 illustrates an ad management page for performing an ad management step for the advertiser interaction system of FIG. 1, in accordance with an exemplary embodiment.

FIG. 5 illustrates an ad management page 500, according to an exemplary embodiment. As illustrated, ad management page 500 may include information such ad performance statistics, which may be displayed in tables and/or charts, and wallet balance and rewards information, according to various embodiments.

Additionally, Ad management step 206 may further comprise providing the advertiser with the option of disabling the ad and/or changing the ad after it has been published. For example, based on an ad's performance, the advertiser may desire to change the ad appearance, rewards structure, etc., and may therefore stop the ad from running until these changes can be made; or the advertiser may permanently disable the ad. In embodiments, wherein an advertiser decides to disable a listed ad, (e.g. from overview page 802), the tokens dedicated to the ad may be refunded, and the ad is disabled from circulation and may be removed from the ad database on server 106.

Consumer Interaction System

Figure 6:
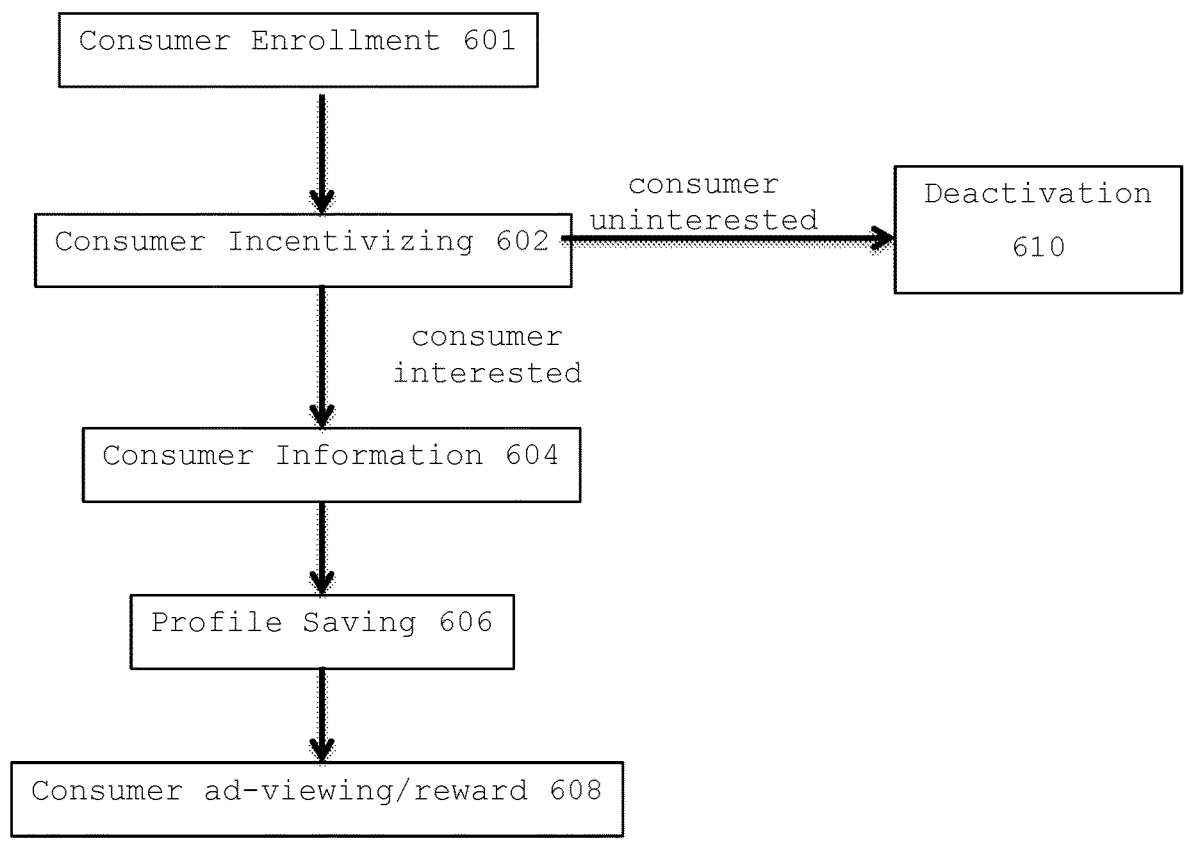
FIG. 6 is a block diagram for the Consumer Interaction System of FIG. 1, according to various embodiments.

According to various embodiments, as shown in FIG. 6, the Consumer Interaction System 104 may comprise prompting the consumer to turn on ads and/or engage with the system 100 (consumer incentivizing step 602). Once the consumer elects to engage, Consumer Interaction System 104 may further include prompting the consumer to provide personal information (consumer information step 604); storing/updating the consumer profile onto the host entity server 106 (profile saving step 606); and/or rewarding the consumer for interaction with the ad (consumer ad-viewing/reward step 608). If the consumer ignores and/or otherwise indicates that he does not wish to view the ad, the ad/incentive system may be deactivated (deactivation step 610).

In embodiments, Consumer Interaction System 104 may further comprise establishing the consumer as a participant (consumer enrollment step 601).

In embodiments, steps 601, 602, 604, 606, 608, and/or 610 may be carried out by the host entity of the advertising method 100, by the consumer of the advertising method, or both. In embodiments, the host entity may prompt and/or guide the consumer to at least partially carry out and/or complete various steps, as detailed below. Additionally, the various steps of consumer interaction system 104 need not be carried out on the same GUI. For example, consumer enrollment step 601 may be carried out through a webpage, while the remaining steps may be carried out on a user browser. Furthermore, steps 601, 602, 604, 606, 608, and/or 610 may be carried out in various orders, and may overlap according to various embodiments.

Consumer Enrollment Step 601

According to various embodiments, the consumer may be required to establish participation status by subscription or enrollment in the system/method 100. In embodiments, once a consumer establishes enrollment, the method 100 may associate the consumer with an id, which may be stored on the server 106.

In embodiments, enrollment may comprise requiring the consumer to install software associated with method 100. In embodiments, the consumer may download the software from a website associated of the host entity and/or a website associated with a particular advertisers and/or an app store. In some embodiments, the host entity and/or advertiser may invite and/or direct a consumer (e.g. via a link) to download the software associated with method 100 via an email message, text message, or other advertising platform. For example, a retailer may obtain an email and/or phone number from an in-store consumer by inviting him/her to enroll in the system (i.e. in order to receive rewards). In various embodiments, the consumer may implement the system on his browser via plug-in software or download a custom browser configured to execute various steps of method 100.

Consumer Incentivizing Step 602

In embodiments, a prompting display may appear on the consumer's device to direct the consumer to engage with the system 100, according to consumer incentivizing step 602. This may include suggesting and/or offering rewards to the consumer for engaging with the system and/or turning on ads, according to step 608. In some embodiments, the prompting display may direct the consumer to provide personal information and/or update his/her profile, according to step 604, which may be a prerequisite to turning on the ads and/or receiving ads, or may be optional (i.e. where the profile can be updated) if a profile has already been created. In some embodiments, the display may also provide the option of disabling the system permanently, or temporarily (e.g. for a specified time period, until the next user session or day, etc.).

Figure 7:
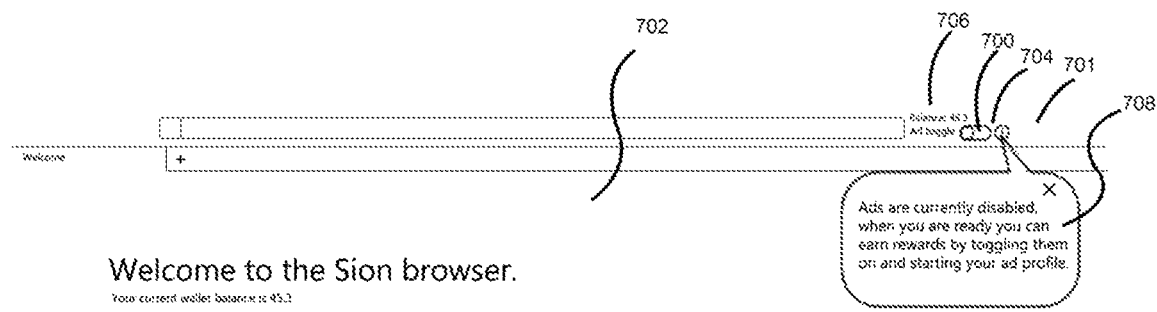
FIG. 7 illustrates a prompting display configured to carry out a consumer incentivizing step of the Consumer Interaction System, according to an exemplary embodiment.

In embodiments, the consumer may send a request (ping), which may be a backend request from his browser to the server. According to various embodiments, and as exemplified in FIG. 7, a prompting display 700 may appear on the consumer's browser 702, upon opening the browser. According to various embodiments, and as shown in the figure, the prompting display 700 may be presented at the tab section 701 of the browser 702, such that it is unobtrusive, and may include at least one icon 704, text, and/or image. The icon 704 may be, for example, a button, which can be "opened" to engage with the method 100, as illustrated. In embodiments, the prompting display 700 may also include a text 706, as shown. For example, the text 706 may include information such as the amount of virtual currency (i.e. tokens) which has been earned, as illustrated in the figure. In embodiments, the prompting display 700 may further include a message 708 (e.g. in the form of a 'call out' or bubble) which may be opened and/or expanded by clicking or hovering over with a mouse, as shown in the figure. In some embodiments, the display 700 may further include a deactivation element to allow a user to disable the system permanently (i.e. unsubscribe) in which case the system may deactivate according to deactivation step 610; or to allow the user to disable temporarily (e.g. for a specified time period, until the next user session or day, etc.).

Various other embodiments will be apparent to one skilled in the art. For example, the display may include various images, texts, animation, sound effects, etc. which may appear in other sections of the browser and/or device display.

Consumer Information Step 604

According to various embodiments, once a consumer indicates an intent to engage with the system according to step 602 (e.g. turn on ads/earn rewards), the consumer may then be prompted to provide personal information, according to consumer information step 604. This information may be used for ad targeting. In embodiments, consumer information step 604 may include prompting the consumer to complete a basic profile; prompting the consumer to further complete his/her profile (i.e. by providing more specific information, which can be used in refining consumer targeting); prompting the consumer to save his information/ad profile; and/or prompting and/or allowing the user to update and/or change a saved profile and save the updated changes. Once the profile has been created and/or updated, the profile can be stored and/or updated onto the server 106, according to profile saving step 606.

In embodiments, consumer information step 604 may be triggered once the consumer elects to turn on ads and earn rewards, according to step 602. The consumer may then be prompted to provide personal information according to step 604, as a prerequisite to receiving ads and earning rewards, according to consumer ad-viewing/reward step 608. In embodiments, where a profile has already been saved (e.g. pursuant to a prior user session) and/or wherein the consumer does not wish to update a saved profile, he may be directed to consumer ad-viewing/reward step 608 wherein he/she can view ads. According to various embodiments, such ads may be presented to the consumer (e.g. by embedding in the consumer's browser) based on the existing profile. In other embodiments, even where a profile has been updated, the consumer may still be required to indicate ad categories he/she is interested in viewing, such that the ads viewed (e.g. embedded in the browser) may be based on what the consumer desires to view at the time of the session.

In embodiments, personal information provided according to step 604 may include basic information regarding ads the consumer wishes to view. This information may be required for any ads to be displayed to the user. In further embodiments, the consumer may provide further targeting information such as consumer's general interests/hobbies, personal details such as demographics, job and salary, age, gender, and various other details which may improve ad targeting.

According to various embodiments, ads may be toggled on to a user's profile/ad viewing page once basic information, i.e. ad categories of interest, are provided, wherein more specific profile information used to refine targeting may not be required for ad viewing. In further embodiments, providing more specific information may increase rewards awarded for ad viewing.

Figure 8A:
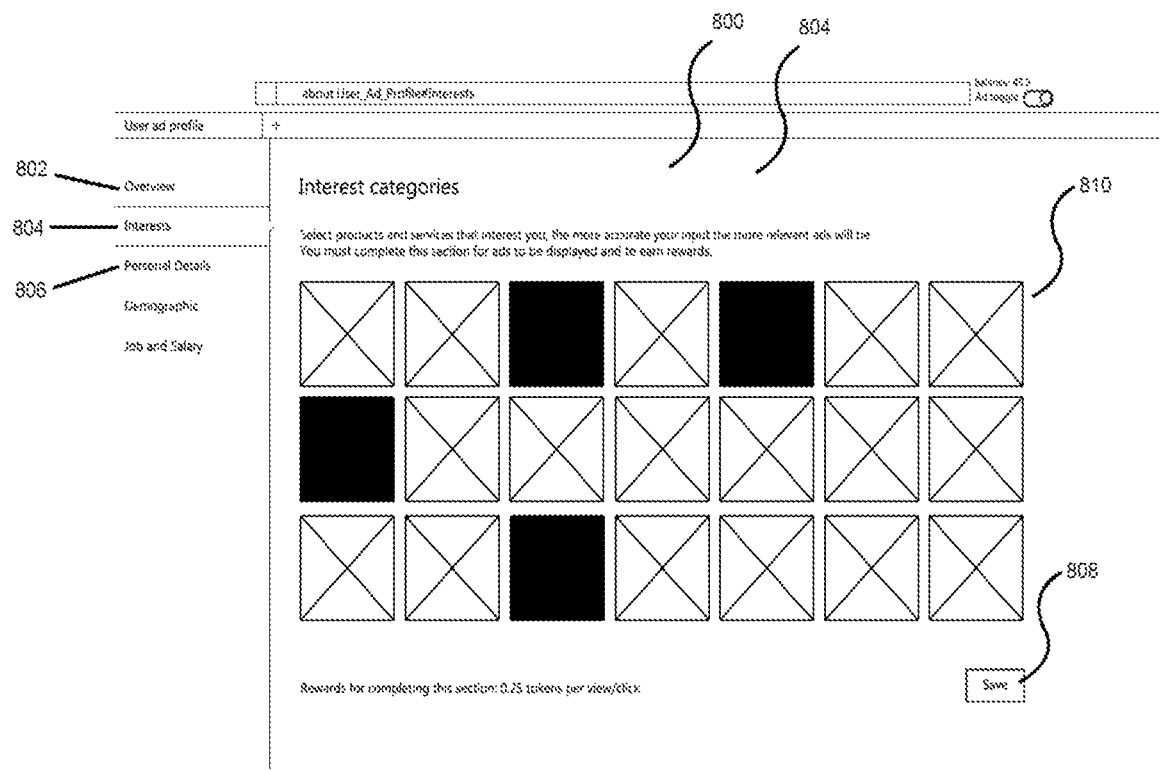
FIGS. 8A and B illustrate a user ad profile page configured for carrying out consumer information step of the Consumer interactive system, according to various embodiments.

FIGS. 8A and B illustrate a "user ad profile" page 800 configured for carrying out consumer information step 604, according to an exemplary embodiment. As illustrated, the page 800 may include various sections (subpages), such as an overview section 802 (see FIG. 8B), an interests section 804 (see FIG. 8A), a personal details section 806, etc., according to various embodiments. The page 800 may further include a save button 808, allowing the user to save the inputted information and/or changes according to step 606. In embodiments, the saved/updated profile is then sent and stored one the server 106 and associated with the user id.

As shown in FIG. 8A, the interests subpage 804 may include a display 810 featuring various interest categories on which the consumer may click to indicate his specific product/service interests, according to various embodiments. In embodiments, interest categories may be generally selected, or based on categories listed by advertisers enrolled in the system. Other embodiments, such as basing interest categories on personal detail information, surveys, user profiling, personality tests, etc., may be apparent to one skilled in the art. According to various embodiments, interest categories and other broad information categories may have associated keywords, wherein in the backend the ads and the user profiles may be matched together using groups of keywords. In some embodiments consumers and/or advertisers may be able to edit individual keywords themselves as well as the broader information categories for more control.

Additionally, the consumer may be offered increased rewards, based on the amount of information provided according to step 604. Thereby, while a consumer may only need to provide basic information regarding ad interest categories to engage with the ad viewing incentive system, the consumer may be offered increased rewards for providing additional targeting information. In embodiments, the number of tokens offered per may be increased as more information is provided by the consumer. As the information provided is used in selecting ads to be displayed to the consumer (ad targeting), the consumer who engages to earn rewards may be motivated to provide more targeting information, as it may enable him to receive more ads and/or increase the rewards for each ad interaction.

Figure 8B:
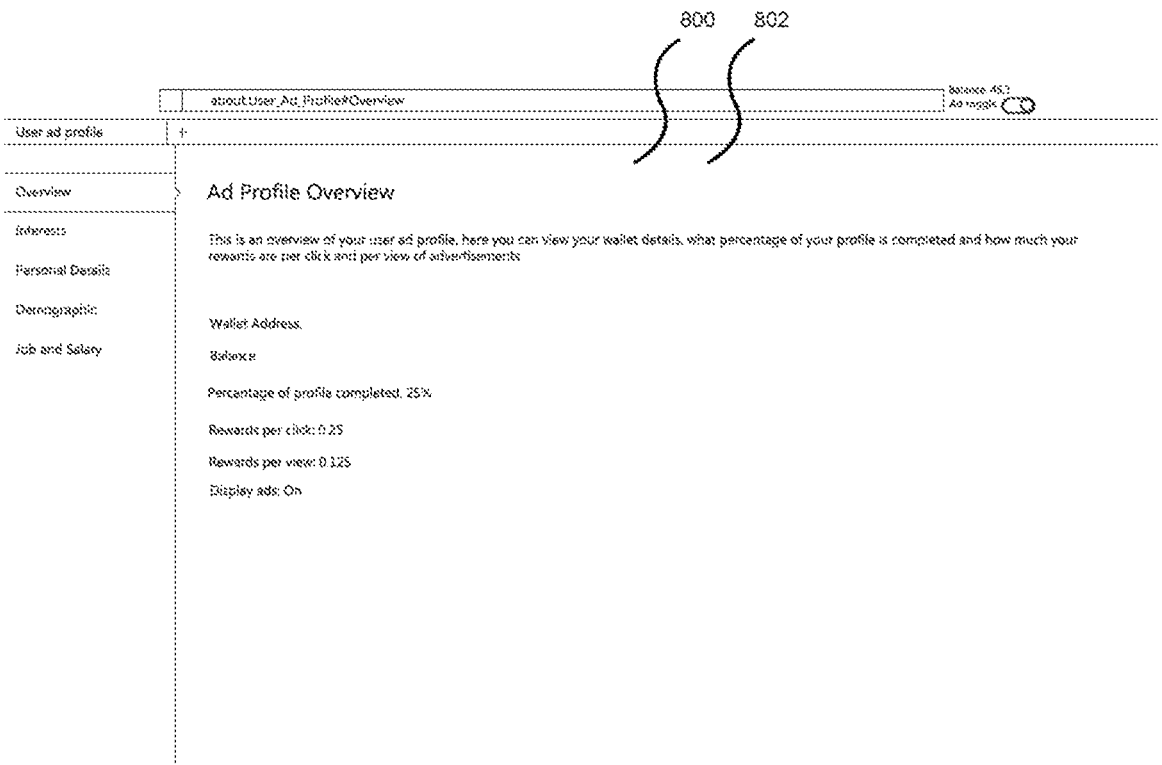
FIG. 8B is an exemplary embodiment of an overview subpage of the user profile page.

FIG. 8B illustrates the overview subpage 802 of the "user ad profile" page 800, wherein, a consumer may view information regarding his ad profile. This may include information regarding the consumer's virtual wallet (e.g. wallet address and balance); percentage of profile completed; rewards which may be earned per click and/or per view, etc., according to various embodiments.

Consumer Ad-Viewing/Reward Step 608

According to various embodiments, Consumer ad-viewing/reward step 608 may comprise presenting an Ad to the consumer and/or rewarding the consumer upon interaction with the ad. According to various embodiments, this step may be enabled once a consumer has provided ad profile information.

In embodiments, the ad(s) selected for display may be based on targeting information comprising ad category selections made by the consumer, and may be further based on more detailed targeting information provided by the consumer. In embodiments, the ad may be selected for display to a particular consumer upon matching targeting criteria in the ad and the consumer profile.

In embodiments, the consumer may activate ad interaction by a request and/or indication of intent to view ad. For example, the consumer may click on an "ad toggle" prompt (i.e. text 706) and/or send the request via a ping to the server. This may effectuate sending an ad request with user id associated with the consumer profile to the server 106, whereby an ad may be matched with the user profile and sent to the user. In embodiments, selecting the ad to be sent may comprise matching the consumer profile data with the most relevant ad based on the ad profile data. (However, in some embodiments, sending an ad to the consumer may also be based on the consumer's past ad-interaction activities, such as time elapsed from the last reward event, the consumers place in a consumer prioritized roster system, etc. as detailed below). Additionally, sending the ad may trigger a consumer reward event. In embodiments, the ad and incentive system may be embedded in the user's browser. In embodiments, the browser may include an ad section for receiving, storing, and/or enabling viewing of the ad. In embodiments, once embedded ads (in-browser ads) are toggled on, the ads may be updated upon the consumer opening the browser, or upon opening a new browser tab/window and/or refreshing a tab/window via a request sent to the server 106.

Other embodiments may be apparent to one skilled in the art. For example, an ad display prompt may be sent to prompt the consumer to open the ad, for enabling the consumer to view and/or interact with the ad. A prompting display may be, for example, an icon, text message, image, etc. which may be opened and/or expanded by clicking or hovering over with a mouse, according to various embodiments. In some embodiments, the Ad display may appear on the ad section of the consumer's browser.

Once a consumer interacts with a specific ad, the user may earn rewards. The rewards may be in the form of virtual currency, e.g. tokens, which may be stored in a virtual wallet, according to various embodiments. In embodiments, a user reward event may be triggered by consumer ad interaction. According to various embodiments, consumer ad interaction may comprise an ad-viewing event which may entail opening an indication or prompt appearing on the consumers screen to expand to ad and thus view a full ad banner. In embodiments, ad interaction may further comprise an ad-clicking event, wherein the consumer may click on the ad banner to open a link embedded in the ad (such link may, for example, direct the consumer to the advertiser's website, according to various embodiments).

Other actions triggering a reward event may include, for example, making a purchase through the ad, providing information through the ad, referring to other consumers, signing up to receive emails and/or coupons, or other interaction, etc., as may be apparent to those skilled in the art. Additionally, reward amounts may be based on the type of consumer ad interaction event. For example, a higher reward amount may be provided for ad clicking over ad viewing.

In embodiments, once a user reward event occurs, a reward request may be sent to the server 106, along with the user id, the engaged ad's id, and type of consumer engagement (e.g. click, view, etc.); the reward amount may be calculated and retrieved from the advertiser's escrow account (which may be related to the particular ad/ad id), then sent to the user's wallet.

In embodiments, the method 100 may further comprise setting a time period between reward ad viewing. As such, once a reward is sent to the consumer's wallet, a specific period of time may be required to elapse before another reward can be earned by the same consumer. In embodiments, this may comprise re-setting a time counter when a reward is earned. Thereby, the counter, which may be stored on the server 106, will reject the consumer/browser reward request if made before the specified time has elapsed. However, a non-reward request may be allowed regardless of counter status. According to various embodiments, the time period required between reward requests may be set by the system and/or advertiser. Additionally, in some embodiments, an ad which has previously been viewed may not be re-viewed for rewards, but may be viewed as a non-reward request. This may deter a consumer from abusing the system and/or viewing ads that the consumer is not interested in viewing but for the reward earned. In some embodiments, consumer participants may be sorted into a prioritized roster system to determine an order of priority given to the consumer participant(s) for receiving ads in general and/or for receiving a particular ad (i.e. which consumers receive ads before others). Thus, the prioritized roster system of consumers may relate to overall ad viewing by the consumers, and/or to each particular ad. Factors in determining priority may include the amount of time elapsed since a particular consumer participant(s) received an ad and/or earned a reward, websites viewed by the particular consumer participant(s) since the participant(s) received an ad and/or earned a reward, maximum rewards earned by the particular participant(s) over a past short time window (e.g. 24 hr period), and/or maximum rewards earned by the participant(s) over a past longer time window (e.g. 7 day period). Other factors for determining consumer participant priority for viewing an ad may include for example, the relevance of the ad to the consumer, purchases made by the consumer, etc., as may be apparent to one skilled in the art.

In embodiments, a reward earned may be used in connection with the specific advertised product/service, and/or any other product/service exchange, donation, gifting, independent of the system 100.

In some embodiments, the method 100 may further comprise a coupon incentive system, as detailed below.

Coupon System

FIG. 9-12F illustrate a coupon system 900, according to various embodiments. In embodiments, method 100 may incorporate coupon system 900, and may utilize virtual currency/block chain tokens acquired according to method 100. In embodiments, the system 900 may comprise a advertiser interactive coupon system 902 (see FIG. 9), and a consumer interactive coupon system 903 (see FIG. 11), according to various embodiments.

Advertiser Interactive Coupon System 902

Figure 9:
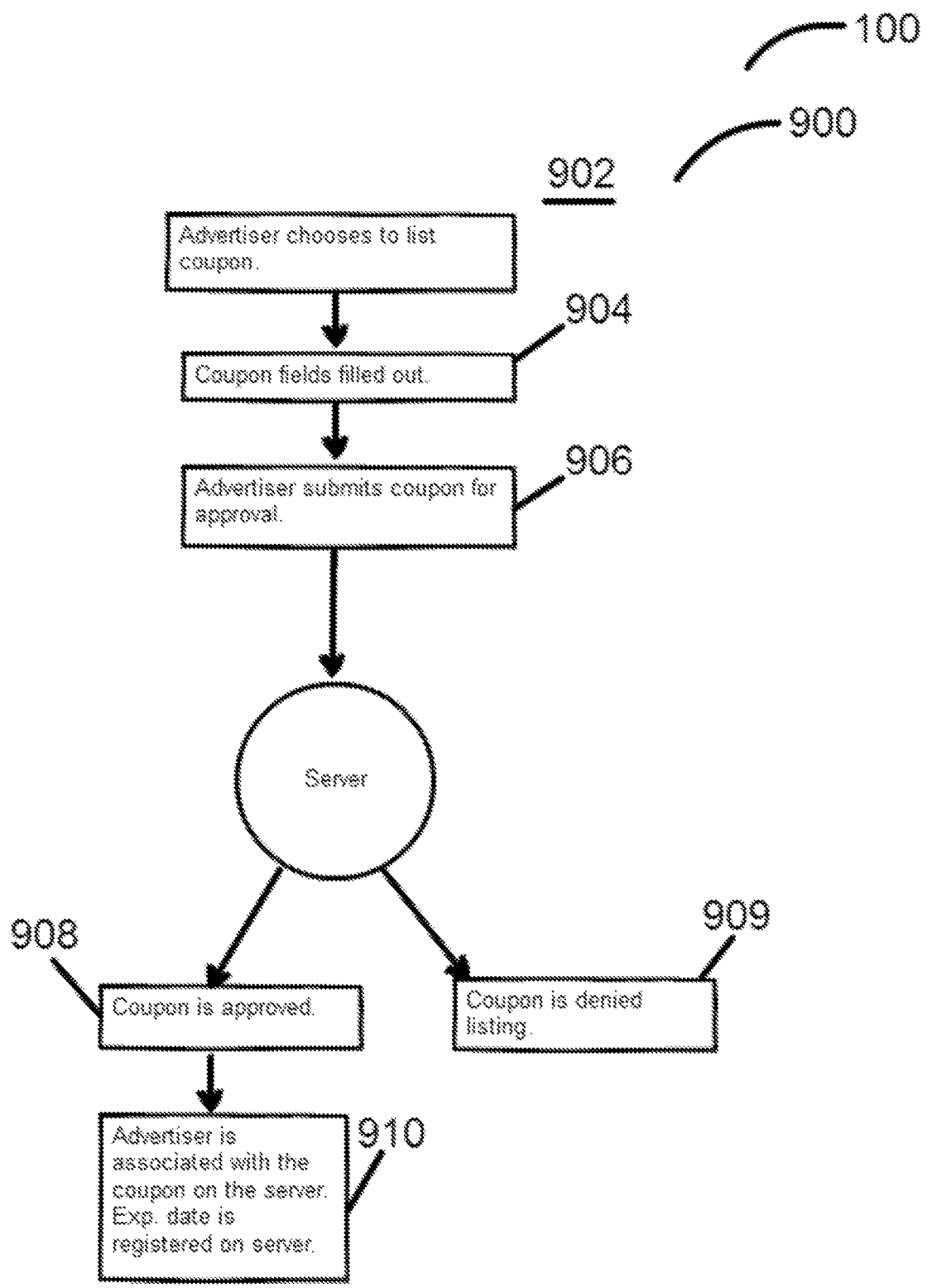
FIG. 9 is a block diagram of an advertiser interactive coupon system, which may be a part of the advertising method of FIG. 1, according to various embodiments.
Figure 10:
FIG. 10 is a coupon submission page, according to an exemplary embodiment, which may be used in implementing the advertiser interactive system of FIG. 9.

As shown in FIG. 9, an advertiser interactive system 902 of the coupon system 900 may comprise a coupon creation step 904 by an advertiser. This may comprise providing information which may be filled in and/or uploading images, such as the coupon title, URL, expiration date, name of business, discount on product, logo/image, and/or other auxiliary information, according to various embodiments. The information may be provided on a coupon submission page 1000, as illustrated in FIG. 10, according to an exemplary embodiment.

In embodiments, coupon system 900 may further comprise a coupon submission step 906, wherein the coupon may be submitted for approval. In embodiments, the coupon may be submitted on the coupon submission page 1000, e.g. by clicking on a "submit" button 1002. Thereafter, the coupon may be sent to the system server 106 for approval.

Thereafter, the coupon may be approved, according to coupon approval step 908 or denied approval according to coupon rejection step 909.

If approved, the coupon may be sent/stored in a coupon database of the server 106, according to coupon registration step 910. This may comprise associating the coupon with an id of the advertiser, and, if applicable, registering an expiration date of the coupon registered on the server, according to various embodiments.

If denied, the system 900 may notify the advertiser according to step 909.

In embodiments, advertiser interactive system 902 of method 900 may be integrated with the Advertiser Interaction System 102 of method 100. For example, an advertiser may be prompted to create a coupon, similar to advertiser prompting step 203, on the same browser screen used for step 203, wherein the browser screen may include a prompt to enter the coupon submission page 1000, according to various embodiments.

Consumer Interactive Coupon System 903

Figure 11:
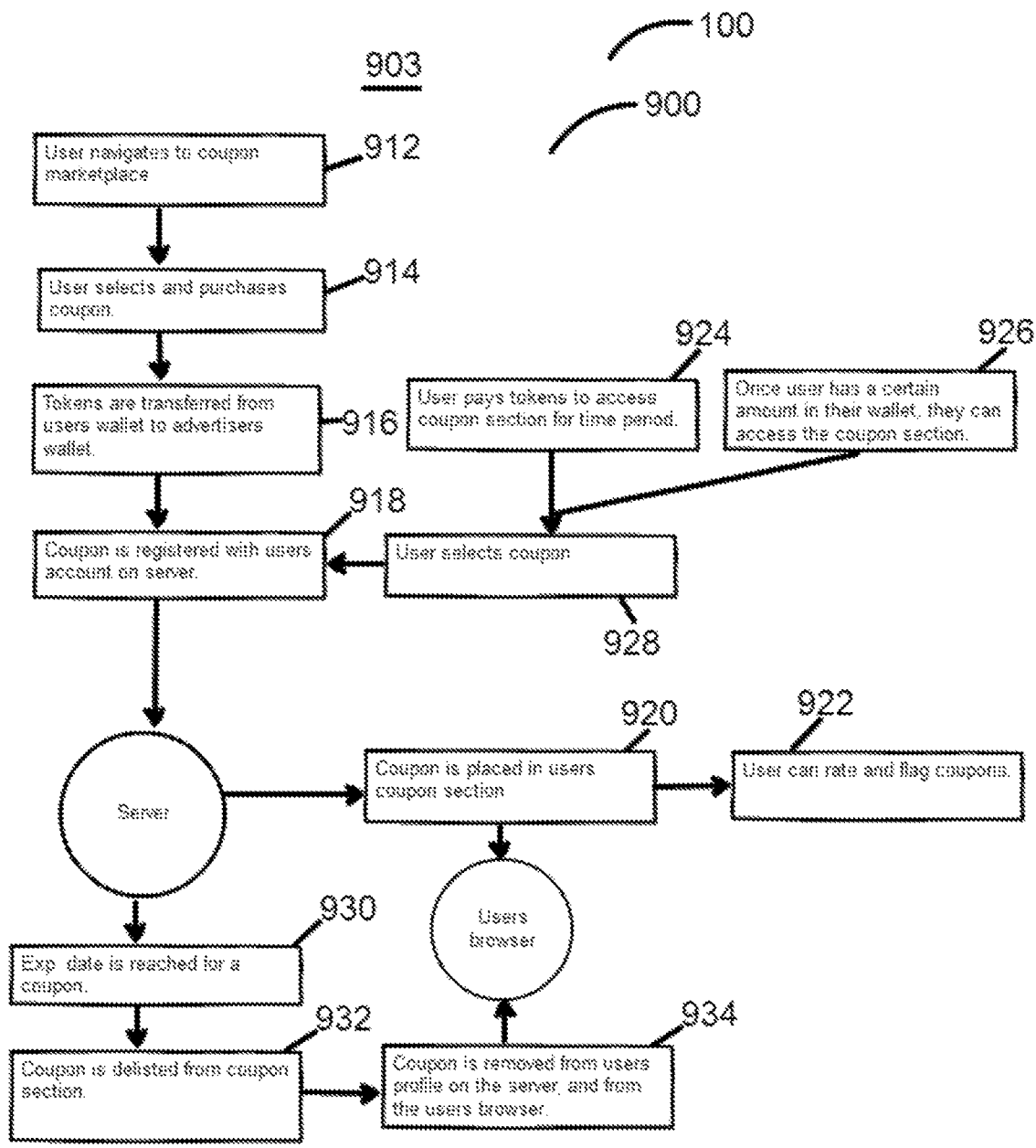
FIG. 11 is a block diagram of a consumer interactive system of the coupon system, according to various embodiments.

With reference to FIG. 11, consumer interactive coupon system 903 may comprise enabling a consumer to purchase coupons created according to the advertiser interactive coupon system 902. In some embodiments, system 903 may be integrated with Consumer interaction system 104 of system 100, and may, for example, use the same browser, consumer id, etc.

In embodiments, system 903 may comprise navigating to a page of the coupon system 900 by a consumer (step 912); selecting and purchasing a coupon by the consumer (step 914); transferring virtual currency (e.g. tokens) from the consumer's wallet to the advertiser's wallet (step 916); and registering the coupon with the user's id on the server (step 918). In embodiments, system 903 may further comprise placing the coupon in a user's in-browser coupon section (step 920). In embodiments, system 903 may further comprise allowing the user to rate the coupon (for example, via a 1-5 score) and/or indicate if there is a problem with the coupon. In embodiments, this rating and/or indication may be available to other consumers of the system 900.

In embodiments, system 903 may further comprise requiring the consumer to pay to access the coupon system (step 924). In some embodiments, access may be for a limited time period. In further embodiments, a consumer may be allowed to access the coupon system once he has a certain amount of currency in his wallet (step 926). In further embodiments, once a consumer access the coupon system according to steps 924 or 926, he may select a coupon (step 928), which may be registered for free, on the server according to step 918.

In embodiments, system 900 may further comprise determining when an expiration date for a coupon has been reached (step 930) and sending notification to the advertiser. In embodiments, this may be for a coupon registered to the advertiser alone, or to both the advertiser and a consumer. In embodiments, upon expiration, the coupon may be delisted form the coupon section (step 932) and/or may removed from the consumer's profile and/or browser.

In embodiments, virtual currency/block chain tokens earned according to consumer ad-viewing/reward step 608 may be used to pay for coupons in step 916, and/or determine access according to step 926.

FIGS. 12 A-F provide examples of pages which can be used to perform various steps of coupon system 900, according to exemplary embodiments.

Figure 12A:
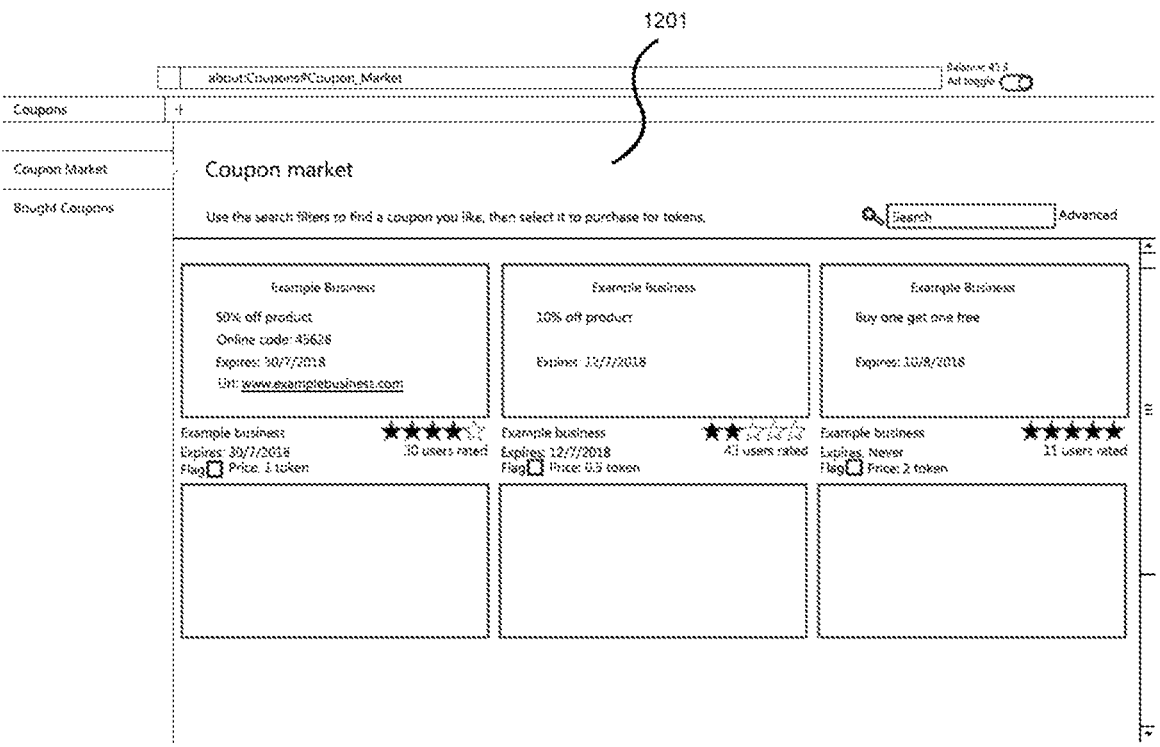
FIG. 12A is an example of a "coupon marketplace", according to an exemplary embodiment, which may be used in implementing the consumer interactive system of FIG. 11.

FIG. 12A is an example of a "coupon marketplace" page 1201, to which a user can navigate according to step 912.

Figure 12B:
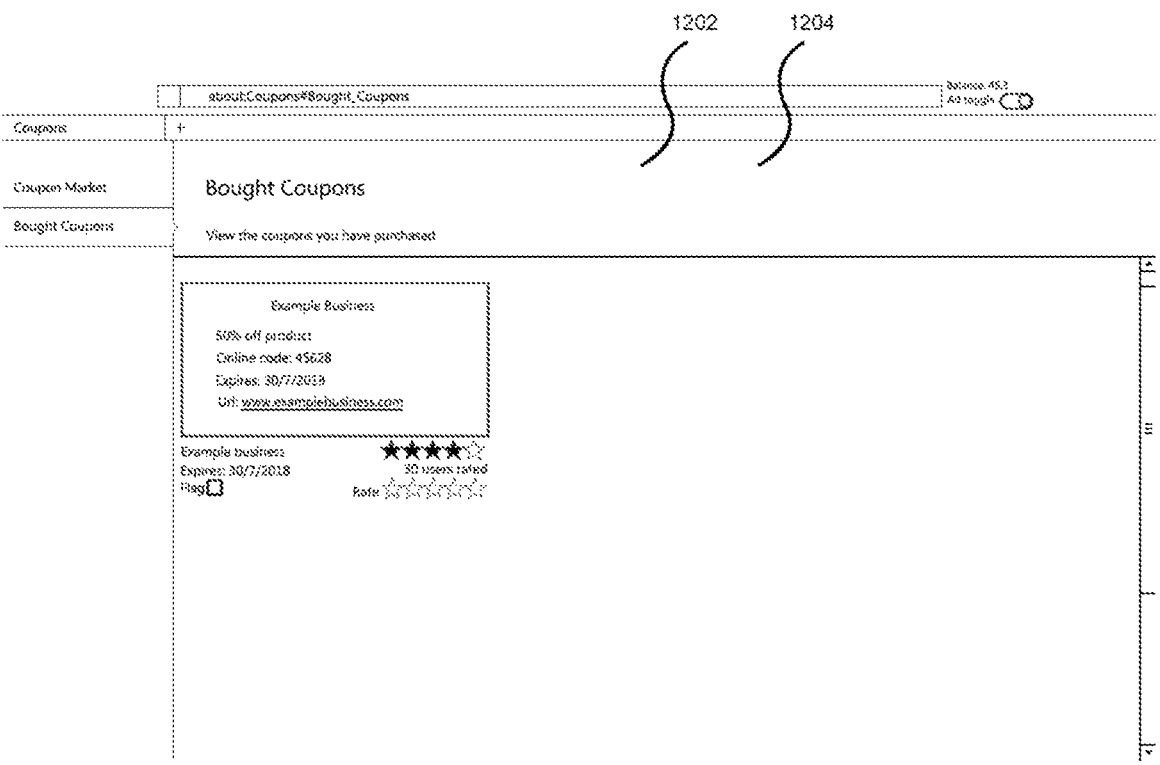
FIG. 12B is an example of a consumer's coupon section page showing bought coupons, according to an exemplary embodiment, which may be used in implementing the consumer interactive system of FIG. 11.
Figure 12C:
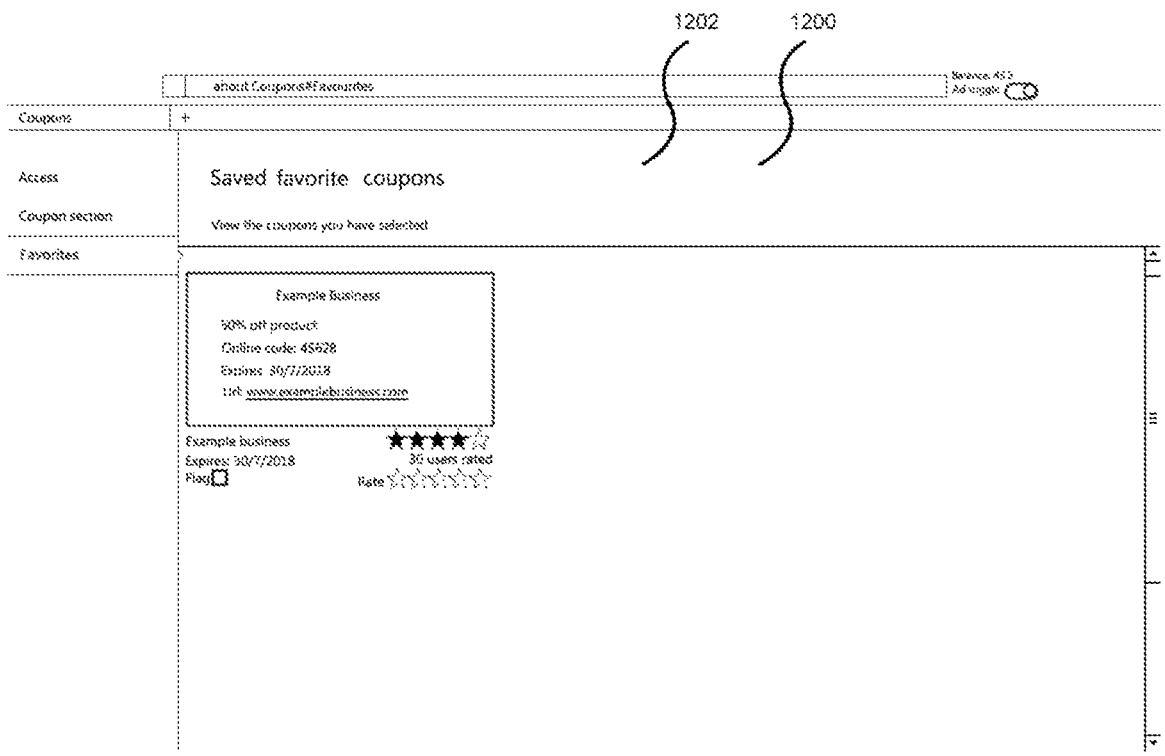
FIG. 12c is an example of a consumer's coupon section page showing saved favorite coupons, according to an exemplary embodiment, which may be used in implementing the consumer interactive system of FIG. 11.
Figure 12D:
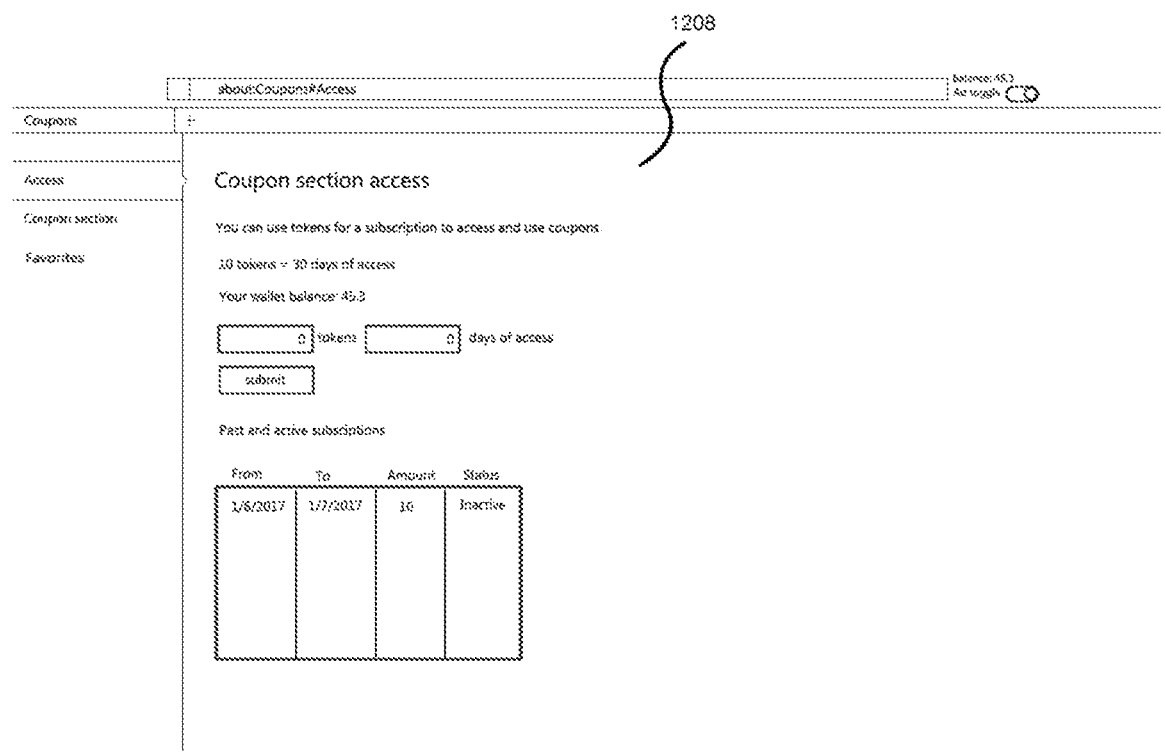
FIG. 12D is an example of a coupon section access page, according to an exemplary embodiment, which may be used in implementing the consumer interactive system of FIG. 11.
Figure 12E:
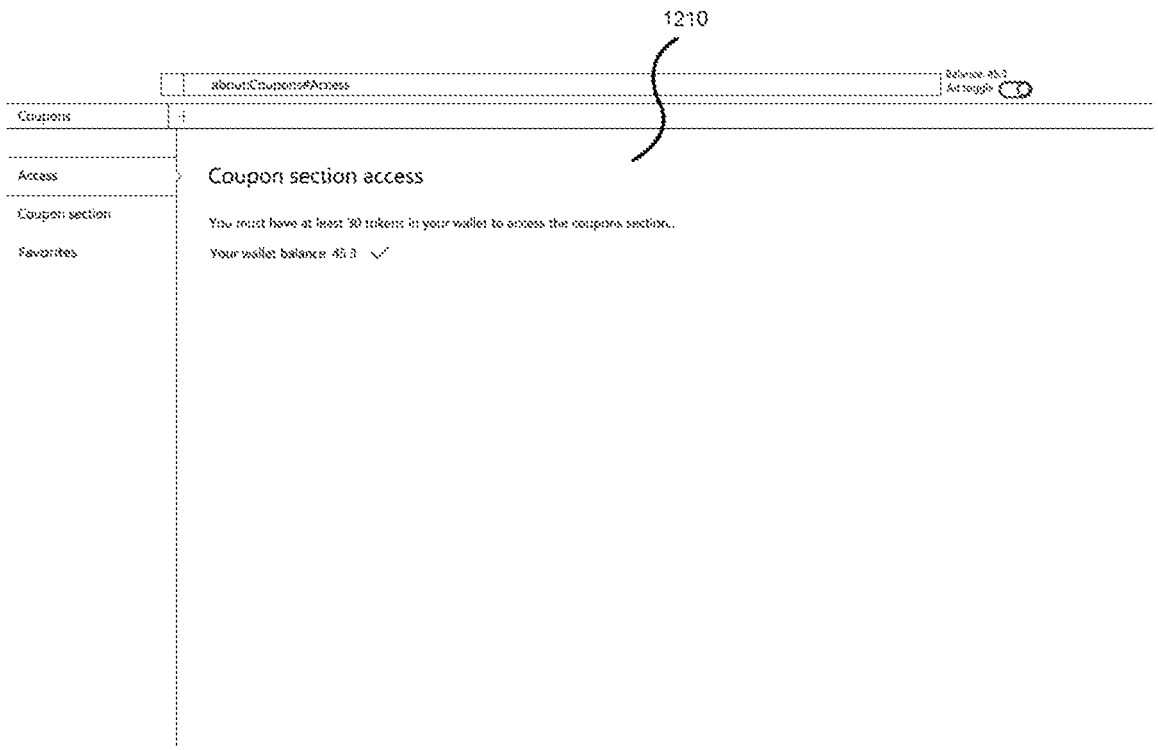
FIG. 12E is an example of a coupon section access and balance listing page, according to an exemplary embodiment, which may be used in implementing the consumer interactive system of FIG. 11.
Figure 12F:
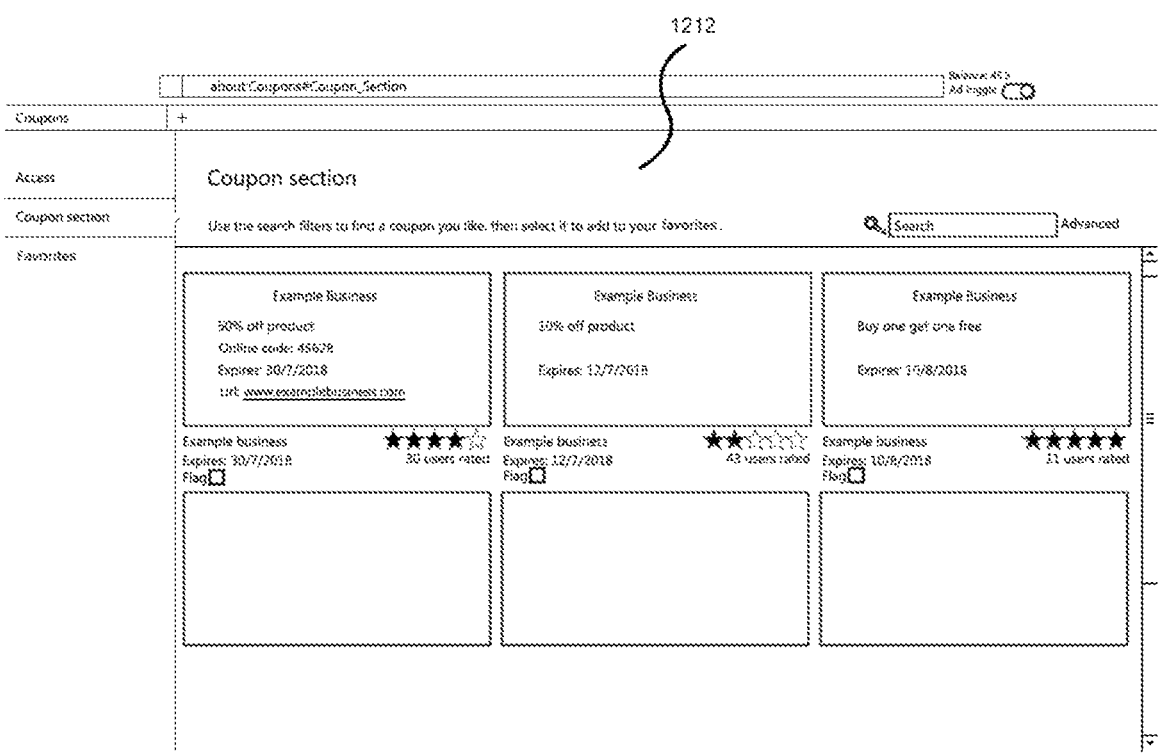
FIG. 12F is an example of a of a coupon section selection page, according to an exemplary embodiment, which may be used in implementing the consumer interactive system of FIG. 11.

FIGS. 12B and C both provide examples of a consumer's coupon section page 1202, on which a user can view and rate his registered coupons according to steps 920 and 922. In embodiments, page 1202 may include a page 1204 showing bought coupons (FIG. 12 B) and/or a page 1206 showing saved favorite coupons (FIG. 12 C), according to various embodiments.

FIG. 12 D is an example of a coupon section access page 1208, which can be used to pay for access to coupons according to step 924.

FIG. 12 E is an example of a coupon section access and balance listing page 1210, which can be used in accessing coupons based on account balance, according to step 926.

FIG. 12 F is an example of a coupon section selection page 1212, which a consumer can user to select coupons according to step 928 and/or 914.

All references, including publications, patent applications, and patents, cited herein are hereby incorporated by reference to the same extent as if each reference were individually and specifically indicated to be incorporated by reference and were set forth in its entirety herein.

The methods, systems, process flows and logic of disclosed subject matter associated with a computer readable medium may be described in the general context of computer-executable instructions, such as, for example, program modules, which may be executed by a computer. Generally, program modules may include routines, programs, objects, components, data structures, etc. that perform particular tasks or implement particular abstract data types. The disclosed subject matter may also be practiced in distributed computing environments wherein tasks are performed by remote processing devices that are linked through a communications network. In a distributed computing environment, program modules may be located in local and/or remote computer storage media including memory storage devices.

The detailed description set forth herein in connection with the appended drawings may be intended as a description of exemplary embodiments in which the presently disclosed subject matter may be practiced. The term "exemplary" used throughout this description means "serving as an example, instance, or illustration," and should not necessarily be construed as preferred or advantageous over other embodiments.

This detailed description of illustrative embodiments includes specific details for providing a thorough understanding of the presently disclosed subject matter. However, it will be apparent to those skilled in the art that the presently disclosed subject matter may be practiced without these specific details. In some instances, well-known structures and devices are shown in block diagram form in order to avoid obscuring the concepts of the presently disclosed method and system.

The foregoing description of embodiments may be provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims may be not intended to be limited to the embodiments shown herein, but may be to be accorded the widest scope consistent with the principles and novel features disclosed herein. It may be contemplated that additional embodiments are within the spirit and true scope of the disclosed subject matter.

What is claimed is:

1. A computerized advertising method for implementation via a server, and provided to a user through a processing device operable by the user, through a user interface of the processing device, the advertising method comprising:
   guiding an advertiser to create at least one ad through a processing device operable by the advertiser;
   compiling a plurality of ads associated with a plurality of advertisers, for storage on at least one database of the server;
   incentivizing a consumer to request to view an ad through a processing device operable by the consumer, by offering a reward to the consumer for viewing the ad,
   acquiring from the consumer voluntary personal profile data for storage on the at least one database of said server, said personal profile data being acquired through the processing device operable by the consumer, said personal profile data being a prerequisite for enabling the consumer to view an ad on said processing device operable by the consumer, for a reward, wherein said consumer profile data comprises information regarding the consumer useful for ad targeting,
   upon receiving a consumer request to view an ad for a reward, sending to the consumer through said server, an ad which the consumer can view for a reward, provided that the consumer is determined to be qualified to view an ad for a reward,
   determining via said server, whether the consumer is qualified to view an ad for a reward prior to sending an ad to the consumer, wherein determining whether the consumer is qualified comprises determining an amount of time which has elapsed from a prior reward event related to the consumer,
   wherein sending the consumer an ad to view for a reward comprises matching the consumer with a relevant ad based on said personal profile data, by matching targeting criteria in the ad with said consumer profile data, wherein said relevant ad is selected from said plurality of ads,
   wherein an ad viewing request by the consumer is a prerequisite for enabling ads to be sent to the consumer and wherein the ad viewing request by the consumer is unrelated to a specific category of goods or services,
   wherein a reward amount offered to the consumer for interacting with the ad is based on the amount of consumer profile data, and is increased as the consumer provides more data,
   wherein said advertising method is implemented via software and/or hardware resident on at least one electronic device, and
   wherein the consumer is an established participant of a consumer interaction system associated with the advertising method.

2. The advertising method of claim 1, wherein said information regarding the consumer includes at least one category of goods and/or services of interest to the consumer.

3. The advertising method of claim 1, wherein a reward offered to the consumer comprises virtual currency provided by the advertiser.

4. The advertising method of claim 3, wherein the virtual currency comprises block chain tokens.

5. The advertiser method of claim 1, further comprising requiring the consumer to establish participation status by providing consumer identifying information and/or downloading software for implementing the advertising method on an electronic device.

6. The advertising method of claim 1, further comprising providing information to the advertiser regarding the performance of the ad to assist the advertiser in evaluating the performance of the ad.

7. The advertising method of claim 1, wherein the method is at least partially performed on a browser of a processing device operated by the consumer and/or advertiser.

8. The advertising method of claim 1, wherein guiding an advertiser to create at least one ad comprises:
   guiding the advertiser to provide ad profile data, said ad profile data including at least one category of goods and/or services to which the ad relates;
   guiding the advertiser to customize an appearance of the ad; and assigning currency reward amount dedicated for rewarding a consumer for interacting with the ad.

9. The advertising method of claim 1, wherein a reward offered to the consumer is provided by the advertiser and held in an escrow account associated with the ad.

10. The advertising method of claim 1, further comprising selecting an ad to be sent to the consumer comprising matching the consumer profile data with the most relevant ad based on profile data related to the ad.

11. The advertising method of claim 1, wherein successive reward earning events are separated by a specific time window.

12. The advertising method of claim 1, further comprising a coupon system comprising: offering at least one coupon associated with a product and/or service to the at least one consumer, wherein consumer access to the coupon is based on rewards earned by the consumer for ad viewing.

13. A computerized advertising system for incentivizing a consumer to view advertisements, comprising:
    software resident on at least one electronic device and configured to execute a method comprising:
    offering a reward to the consumer for viewing the ad via a processing device operable by the consumer;
    acquiring from the consumer voluntary personal profile data for storage on at least one database of a server, said personal profile data being acquired through the processing device operable by the consumer, said personal profile data being a prerequisite for enabling the consumer to view an ad on said processing device operable by the consumer, for a reward, wherein said consumer profile data comprises information regarding the consumer useful for ad targeting,
    upon receiving a consumer request to view an ad for a reward, sending to the consumer through said server, an ad which the consumer can view for a reward, if the consumer is determined qualified to view an ad for a reward,
    determining via said server, whether the consumer is qualified to view an ad for a reward prior to sending an ad to the consumer, wherein determining whether the consumer is qualified comprises determining an amount of time which has elapsed from a prior reward event related to the consumer,
    wherein sending the consumer an ad to view for a reward comprises matching the consumer with a relevant ad based on said personal profile data, by matching targeting criteria in the ad with said consumer profile data, wherein said relevant ad is selected from a plurality of ads associated with a plurality of advertisers,
    wherein an ad viewing request by the consumer is a prerequisite for enabling ads to be sent to the consumer and wherein the ad viewing request by the consumer is unrelated to a specific category of goods or services,
    wherein a reward amount offered to the consumer for interacting with the ad is based on the amount of consumer profile data, and is increased as the consumer provides more data
    wherein said method is performed via said electronic device, and
    wherein the consumer is an established participant of the advertising system.

14. The advertising system of claim 13, wherein a reward offered to the consumer comprises money and/or virtual currency.

15. The advertising system of claim 13, the method further comprising determining if the consumer is qualified to view an ad for a reward prior to sending the consumer an ad which the consumer can view for a reward.

16. The advertising system of claim 15, wherein determining if the consumer is qualified is based on the amount of time which has lapsed from a previous reward earning event of the consumer.

17. The advertising system of claim 13, wherein a reward amount offered to the consumer viewing the ad is increased as the consumer provides more profile data.

18. The advertising system of claim 13, further comprising setting a prioritized roster system for determining an order of priority among different consumers for enabling said consumer to view an ad for a reward.

* * * * *